United States Patent
Plotnikov et al.

(10) Patent No.: US 11,902,570 B2
(45) Date of Patent: Feb. 13, 2024

(54) REDUCTION OF VISUAL ARTIFACTS IN PARALLEL VIDEO CODING

(71) Applicant: INTEL CORPORATION, Santa Clara, CA (US)

(72) Inventors: Sergei Plotnikov, Folsom, CA (US); Jason Tanner, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 763 days.

(21) Appl. No.: 16/802,283

(22) Filed: Feb. 26, 2020

(65) Prior Publication Data

US 2020/0195965 A1   Jun. 18, 2020

(51) Int. Cl.
*H04N 19/567* (2014.01)
*H04N 19/18* (2014.01)
*H04N 19/157* (2014.01)
*H04N 19/176* (2014.01)

(52) U.S. Cl.
CPC ......... *H04N 19/567* (2014.11); *H04N 19/157* (2014.11); *H04N 19/176* (2014.11); *H04N 19/18* (2014.11)

(58) Field of Classification Search
CPC .. H04N 19/105; H04N 19/119; H04N 19/132; H04N 19/147; H04N 19/157; H04N 19/176; H04N 19/18; H04N 19/436; H04N 19/51; H04N 19/567; H04N 19/61; H04N 19/82
USPC .................................................... 375/240.16
See application file for complete search history.

(56) References Cited

U.S. PATENT DOCUMENTS

| | | | |
|---|---|---|---|
| 2009/0168883 A1* | 7/2009 | Lu | H04N 19/176 375/E7.104 |
| 2013/0058395 A1* | 3/2013 | Nilsson | H04N 19/107 375/E7.153 |
| 2013/0343458 A1 | 12/2013 | Miyoshi et al. | |
| 2017/0013268 A1* | 1/2017 | Kim | H04N 19/61 |

FOREIGN PATENT DOCUMENTS

WO   2015059880   4/2015

OTHER PUBLICATIONS

Extended European Search Report for European Patent Application No. 20214756.7, dated Jun. 1, 2021.
Henry, Felix , et al., "Wavefront Parallel Processing" , JCT-VC Meeting; 96 MPEG Meeting Mar. 16, 2011-Mar. 23, 2011, Geneva.

* cited by examiner

*Primary Examiner* — Christopher S Kelley
*Assistant Examiner* — Ana Picon-Feliciano
(74) *Attorney, Agent, or Firm* — Essential Patents Group, LLP

(57) ABSTRACT

Techniques related to reduction of artifacts in parallel block coding mode selection for video are discussed. Such techniques include, for blocks along a parallel processing split boundary of a video frame, coding mode selection that divides a block into sub-blocks, performs motion estimation for the sub-blocks with skip check disabled and using distortion and coefficient coding cost but exclusive of motion vector coding cost, and evaluates a skip check for the block using the sub-block motion vectors.

17 Claims, 9 Drawing Sheets

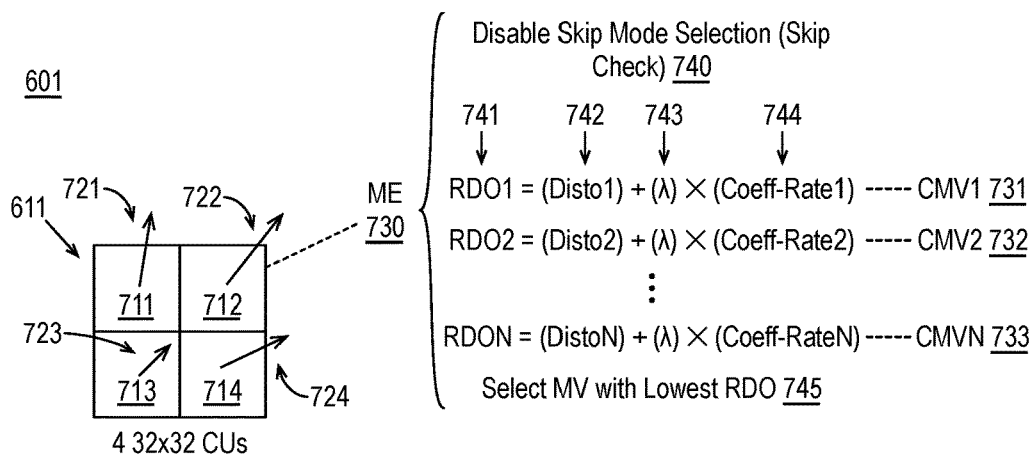
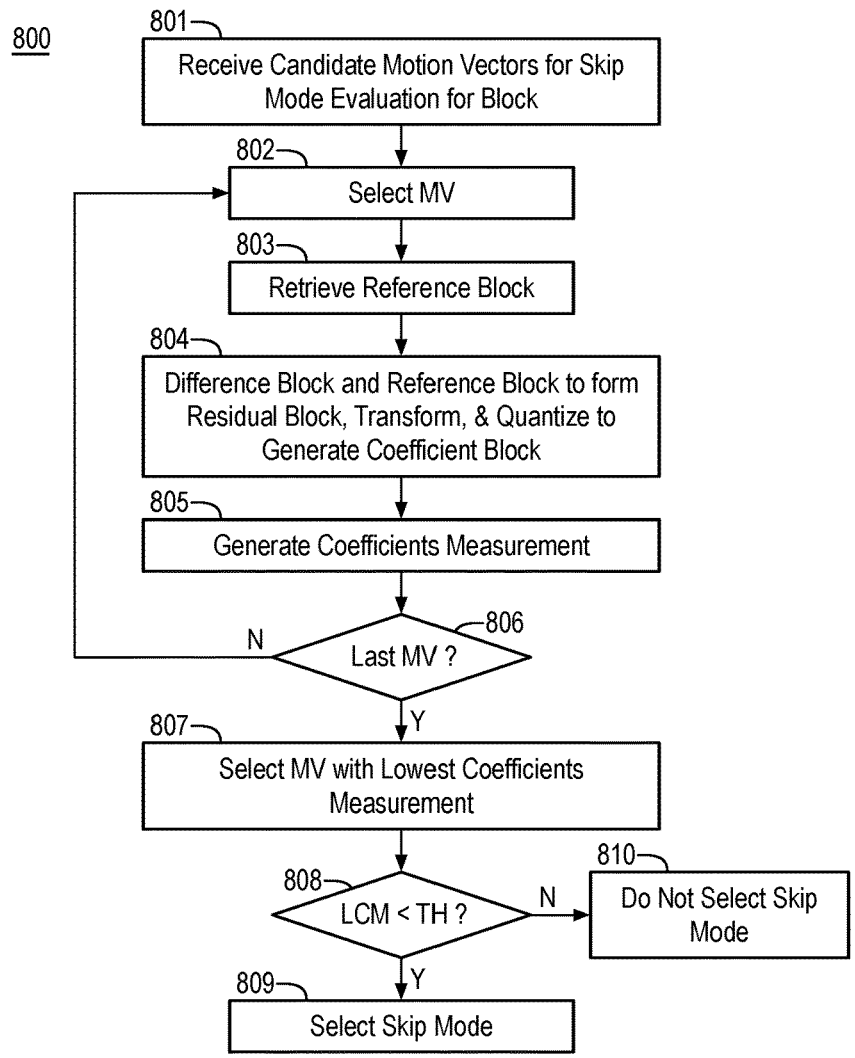
FIG. 7
FIG. 8

REDUCTION OF VISUAL ARTIFACTS IN PARALLEL VIDEO CODING

BACKGROUND

In video compression/decompression (codec) systems, compression efficiency, video quality, and processing efficiency are important performance criteria. For example, visual quality is an important aspect of the user experience in many video applications and compression efficiency impacts the amount of memory storage needed to store video files and/or the amount of bandwidth needed to transmit and/or stream video content. Furthermore, processing efficiency, including processing speed and use of limited computational resources, is an important aspect of encode as there is a continuing desire to encode more quickly and with less power. For example, a video encoder compresses video information so that more information can be sent over a given bandwidth or stored in a given memory space or the like. The compressed signal or data is then decoded by a decoder that decodes or decompresses the signal or data for display to a user. In most implementations, higher visual quality with greater compression and high processing efficiency is desirable.

In some contexts, video encode is performed in a parallel processing environment using, for example, multiple processors or processing cores in parallel to make coding mode decisions for multiple coding units or blocks of a video frame in parallel. Notably, video encoding performance may be limited by available parallelism in a computing environment, which results in poor scaling on multi and many core designs. Currently, techniques to achieve parallel encoding across a group of pictures (GOP), across independent frames, and across independent coding regions within a frame (e.g., tile and wavefront parallelism) are available. However, such techniques cause and/or are susceptible to visual quality problems including obvious visual artifacts in the decoded video.

There is an ongoing concern with improving subjective video quality in video parallel video encode. It is with respect to these and other considerations that the present improvements have been needed. Such improvements may become critical as the desire to compress and transmit video data becomes more widespread.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures:

FIG. 3 illustrates example wavefronts as provided within a video frame;

FIG. 4 illustrates example an example video frame having wavefronts and an example parallel processing split boundary;

FIG. 7 illustrates a depiction of a portion of an exemplary block coding mode selection process for an example block;

FIG. 8 is a flow diagram illustrating an example process for performing a skip check for a block or sub-block;

DETAILED DESCRIPTION

Figure 1:
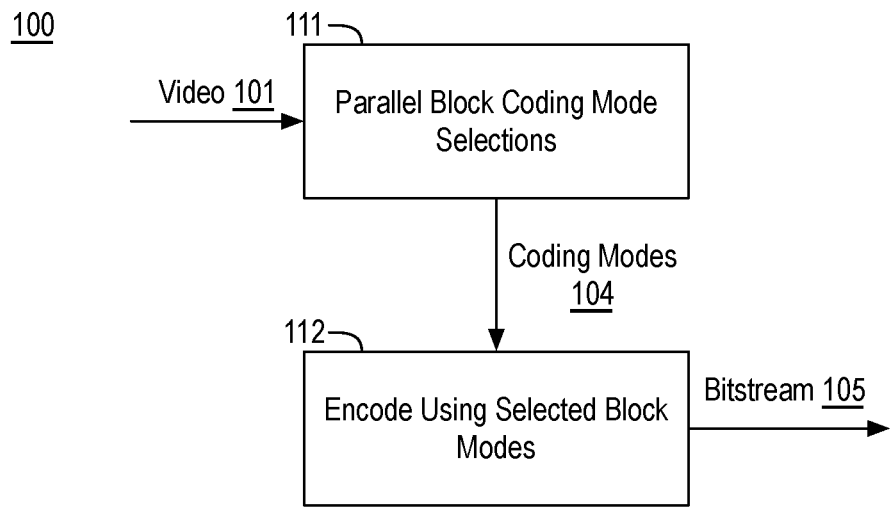
FIG. 1 is an illustrative diagram of an example system for coding video to generate a bitstream.

One or more embodiments or implementations are now described with reference to the enclosed figures. While specific configurations and arrangements are discussed, it should be understood that this is done for illustrative purposes only. Persons skilled in the relevant art will recognize that other configurations and arrangements may be employed without departing from the spirit and scope of the description. It will be apparent to those skilled in the relevant art that techniques and/or arrangements described herein may also be employed in a variety of other systems and applications other than what is described herein.

While the following description sets forth various implementations that may be manifested in architectures such as system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips and/or packages, and/or various computing devices and/or consumer electronic (CE) devices such as set top boxes, smart phones, etc., may implement the techniques and/or arrangements described herein. Further, while the following description may set forth numerous specific details such as logic implementations, types and interrelationships of system components, logic partitioning/integration choices, etc., claimed subject matter may be practiced without such specific details. In other instances, some material such as, for example, control structures and full software instruction sequences, may not be shown in detail in order not to obscure the material disclosed herein.

The material disclosed herein may be implemented in hardware, firmware, software, or any combination thereof. The material disclosed herein may also be implemented as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

References in the specification to "one implementation", "an implementation", "an example implementation", etc., indicate that the implementation described may include a particular feature, structure, or characteristic, but every embodiment may not necessarily include the particular feature, structure, or characteristic. Moreover, such phrases are not necessarily referring to the same implementation. Further, when a particular feature, structure, or characteristic is described in connection with an embodiment, it is submitted that it is within the knowledge of one skilled in the art to effect such feature, structure, or characteristic in connection with other implementations whether or not explicitly described herein.

The terms "substantially," "close," "approximately," "near," and "about," generally refer to being within +/−10% of a target value. For example, unless otherwise specified in the explicit context of their use, the terms "substantially equal," "about equal" and "approximately equal" mean that there is no more than incidental variation between among things so described. In the art, such variation is typically no more than +/−10% of a predetermined target value. Unless otherwise specified the use of the ordinal adjectives "first," "second," and "third," etc., to describe a common object, merely indicate that different instances of like objects are being referred to, and are not intended to imply that the objects so described must be in a given sequence, either temporally, spatially, in ranking or in any other manner.

Methods, devices, apparatuses, computing platforms, and articles are described herein related to parallel video coding and, in particular, to reducing or eliminating visual artifacts due to coding mode decisions made for blocks along a parallel processing split boundary in a video frame.

As described above, it may be advantageous to improve coding performance by performing at least some video coding operations in parallel. In particular, a video frame may be divided into blocks or largest coding units (LCU) or coding tree units (CTU) or the like. As used herein, the term block indicates any pixel region of a video frame such as a 64×64 pixel region. Wavefronts may then be established with respect to the blocks such that coding mode decisions for all blocks in the wavefront are made in parallel. Furthermore, a parallel processing split boundary or wavefront boundary may be provided in the video frame such that the establishment of wavefronts begins again at the wavefront boundary. For example, beginning at the upper left boundary of the video frame and at every upper left corner of the wavefront boundary, blocks may be sequentially labeled such that blocks with the same label (e.g., 0, 1, 2, etc.) are part of the same wavefront. Such wavefront boundaries and parallel block processing techniques are discussed further herein.

Notably, the coding mode decisions for blocks in each wavefront are performed in parallel for increased processing performance. Such coding mode decisions are then used without modification in block processing encode of the video frame (which may be performed in series for the blocks). However, blocks along at least the first wavefront after the boundary do not have information regarding coding mode decisions for blocks above and to the left of them such as coding mode, motion vectors (used as candidates for skip mode, merge mode, etc.) and other information. The techniques discussed herein mitigate or resolve visual artifacts due to selection of such coding modes for blocks immediately after the boundary. For example, visual artifacts due to non-optimal coding mode decisions may be caused along the wavefront boundary (i.e., to the bottom right of the wavefront boundary) and propagated as processing continues from the blocks along the wavefront boundary. For example, artifacts may be particularly prevalent in uniform textures with slow motion. Furthermore, encoding such uniform textures with slow motion at low bitrates further exacerbates such artifacts. Such artifacts also include high frequency uttering of an object (or background) across the object (or background) with parts of the object (or background) moving independently from one another, which are highly visible during playback.

In some embodiments, a parallel coding mode decision implementation is provided such that coding mode decisions for one or more blocks above and to the left of a parallel processing split boundary are selected in parallel with selection of coding mode decisions for one or more blocks below and to the right of the parallel processing split boundary. For those blocks that are immediately below and/or immediately to the right of the parallel processing split boundary, such that coding mode decisions for blocks above and to the left are not available due to the boundary, coding mode decisions are made as follows in some embodiments. First, the block is divided into sub-blocks. For example, a 64×64 pixel block may be divided into four 32×32 pixel sub-blocks. Motion estimation (or modified motion estimation) is performed for the sub-blocks such that skip check is disabled for the sub-blocks. That is, in standard motion estimation processing, a skip check is performed where, if a motion vector candidate for the block generates a coefficient sub-block measurement (generated by differencing the sub-block and a reference sub-block to generate a residual sub-block, transform and quantization of the residual sub-block to generate coefficients, and determination of a measure of the resultant coefficients) that is less than a threshold (e.g., indicating the sub-block can be adequately predicted without further search and indicating residuals do not need to be coded and transmitted), a skip mode is selected and subsequent processing of the sub-block can be avoided (e.g., an early exit may be triggered), which saves computation times. However, in the context of a block along a parallel processing split boundary such processing causes subjective artifacts due to splitting the motion vector field along the parallel processing split boundary. Therefore, skip check is advantageously disabled for the sub-blocks.

Furthermore, during the motion estimation (or modified motion estimation), candidate motion vectors for each sub-block are evaluated using distortion (e.g., a difference between the sub-block and a reference sub-block corresponding to the candidate motion vector) and transformed and quantized coefficient coding cost (e.g., a rate measurement for encode of coefficients using the candidate motion vector) but exclusive of motion vector coding cost (e.g., a rate measurement for the cost of coding the candidate motion vector itself) to select a resultant candidate motion vector for each of the sub-blocks. By eliminating use of the motion vector coding cost, larger motion vectors are more likely to be selected, which, in turn, increases the likelihood the selected motion vector will match motion vectors for blocks across the parallel processing split boundary.

Next, each sub-block motion vector (e.g., each motion vector for a 32×32 sub-block) is then used in a skip check for the block (e.g., a 64×64 block). As discussed with respect to sub-blocks, the skip check determines a coefficient block measurement and compares it to a threshold. If the coefficient block measurement is less than the threshold, a skip mode is selected for the block using the corresponding motion vector. Such techniques again increases the probability that a correct motion vector is selected for the skip mode thereby reducing and potentially eliminating the motion vector field mismatch across the parallel processing split boundary.

Such motion estimation and skip mode techniques may be combined with other coding mode selection techniques for the block such as determination of a best intra mode for the block and motion estimation for smaller partitions of the block. For example, when a skip mode motion vector is not determined for the block, the motion estimation for the 32×32 sub-blocks may be compared to motion estimation for other partitions of the block. The coding mode decision for the block to the right and below the parallel processing split boundary may be contrasted with coding mode decisions for other blocks of the video frame that enable skip check for the 32×32 sub-blocks (using neighboring motion vector candidates, for example), use motion vector coding cost during motion estimation, and do not use sub-block motion vectors for skip mode evaluation of the block.

The techniques discussed herein provide parallel wavefront split frame encode with few or no visible artifacts due to the wavefront split by, for example, biasing motion vectors and motion estimation for blocks immediately adjacent to the left and/or below a parallel processing split boundary toward motion that may be considered true (and in particular, a closer match to motion vectors across the parallel processing split boundary) and away from skip modes that use zero or small motion vectors. Such parallel wavefront split encode provides enhanced computational speed such as 1.6×-2.0× performance gains with respect to serial encode mode decisions. The techniques may be employed in any parallel processing compute environment such as via employment of multi-core central processing units (CPUs), multi-core graphics processing units (GPUs), multi-core GPU accelerators, etc.

FIG. 1 is an illustrative diagram of an example system 100 for coding video 101 to generate a bitstream 105, arranged in accordance with at least some implementations of the present disclosure. As shown in FIG. 1, system 100 includes a parallel block coding mode selection module 111 and an encode module 112 (labeled encode using selected block modes to indicate encode module 112 does not perform mode selection). Each of parallel block coding mode selection module 111 and encode module 112 are illustrated separately for the sake of clarity. However, such modules may be implemented in the same or different encode software, hardware, firmware, etc. Notably, parallel block coding mode selection module 111 may be implemented by a parallel multi-core processor or other parallel processing environment with coding modes being selected for blocks in parallel as discussed further herein while encode module 112 may be implemented by a single core or multi-core processor with block encode (using the selected modes) being performed serially. For example, system 100 may implement a multi-phase encode with a mode selection phase (implemented by parallel block coding mode selection module 111) and an encode phase (implemented by encode module 112).

System 100 provides video compression and system 100 may be a portion of a video encode system implemented via a computer or computing device such as a computing system or the like. For example, system 100 receives video 101 (e.g., video data) and generates bitstream 105 that may be decoded by a decoder to generate a decompressed version of video 101. Bitstream 105 may be compatible with a video compression-decompression (codec) standard such as, for example, HEVC (High Efficiency Video Coding), AVC (Advanced Video Coding/H.264/MPEG-4 Part 10), VVC (Versatile Video Coding/MPEG-I Part 3), VP8, VP9, Alliance for Open Media (AOMedia) Video 1 (AV1), the VP8/VP9/AV1 family of codecs, etc. System 100 may be implemented via any suitable device such as, for example, server, a personal computer, a laptop computer, a tablet, a phablet, a smart phone, a digital camera, a gaming console, a wearable device, a display device, an all-in-one device, a two-in-one device, or the like. For example, as used herein, a system, device, computer, or computing device may include any such device or platform.

System 100 may include other modules or sub-modules not shown for the sake of clarity of presentation. For example, system 100 may include a downsampler and an encode controller, a transform module, a quantization module, an intra prediction module, an inter prediction module, a reference picture buffer, a scanning module, an entropy encoder, etc., which may be implemented via encode module 112. Furthermore, some of such components are discussed herein with respect to FIG. 12. Such modules are known to those of skill in the art and are not discussed further herein with respect to FIG. 1 for the sake of clarity of presentation.

As shown, system 100 receives video 101. Video 101 may include any video sequence for encode. Such video may include any suitable video frames, video pictures, sequence of video frames, group of pictures, groups of pictures, video data, or the like in any suitable resolution. For example, the video may be video graphics array (VGA), high definition (HD), Full-HD (e.g., 1080p), 4K resolution video, 8K resolution video, or the like, and the video may include any number of video frames, sequences of video frames, pictures, groups of pictures, or the like. Techniques discussed herein are discussed with respect to frames, portions, blocks, and sub-blocks having various sizes for the sake of clarity of presentation. As used herein, a block or coding unit may be any size and shape such that it includes a plurality of pixel samples (typically square or rectangular) in any suitable color space such as YUV. Furthermore, a block or coding unit may have sub-blocks or prediction units, which also may be characterized as blocks depending on context. Also a block, sub-block, or coding unit may be optionally divided into a transform block or transform unit for the purposes of transformation of residuals. As used herein, the term size indicates the size of such coding units, transform units, etc. and does not necessarily include the unit itself. The term coding unit or transform unit may indicate the size thereof. Such frames may be characterized as pictures, video pictures, sequences of pictures, video sequences, etc., such coding units or blocks may be characterized as largest coding units, coding units, coding blocks, macroblocks, sub-units, sub-blocks, etc.

For example, a picture or frame of color video data may include a luminance plane or component and two chrominance planes or components at the same or different resolutions with respect to the luminance plane. The video may include pictures or frames that may be divided into blocks of any size, which contain data corresponding to blocks of pixels. Such blocks may include data from one or more planes or color channels of pixel data. For example, a block may be a coding unit or a partition thereof. In the context of the High Efficiency Video Coding (HEVC), the HEVC standard defines a coding tree unit (CTU) for a picture (e.g., a video frame of a video sequence) that may be partitioned into coding units (CUs) that take the form of rectangular blocks having variable sizes. Such coding units may be used as the basic unit or block for coding. Such coding units may be partitioned into transform units (TUs) for transform that also take the form of rectangular blocks (typically square) having variable sizes. However, as discussed, the block of video data may include any block of video data and any coding standard may be used.

Bitstream 105 may be any bitstream representative of video 101 such as an HEVC compliant bitstream or a bitstream compliant to any other codec. During encode of frames of video 101, any number of coding modes, coding unit partitions, transform unit partitions, and so on are evaluated to arrive at final coding modes for units or portions of video 101. Such final coding modes for video 101 as well as other coding information are provided in bitstream 105.

As shown, coding modes 104 are transferred from parallel block coding mode selection module 111 to encode module 112. Coding modes 104 include, as the name suggests, the selected mode for encode of each block of a video frame of video 101 as well as any other pertinent information for the encode. For example, a skip mode for a block is accompanied with a motion vector (possibly a zero motion vector) such that encode module 112 may then perform encode for the block by attaining a reference block corresponding to the motion vector and using the reference block as the predicted block for the block. Each block may then be coded (including a local decode loop) and other operations as known in the art such as loop filtering techniques are performed to generate a reconstructed frame for the current frame. Such reconstructed frames may be transferred to parallel block coding mode selection module 111 for use in coding mode decision selection for subsequent frames, and so on such that parallel block coding mode selection module 111 produces coding mode decisions and encode module 112 generates bitstream 105 (for use by a decoder) and reconstructed frames (both for use locally in the encode by encode module 112 and for use by coding mode decisions and encode module 112 in coding mode selection).

Notably, during encode, a video frame of video 101 is divided into spatial blocks or portions that are predicted from the pixels surrounding the block or portion (spatial/intra prediction) or from pixels of a prior or subsequent frame with a similar region to the block or portion (temporal/inter prediction). The block or portion may optionally be divided into different size sub-blocks or sub-portions that have different available modes. The decision between all of these choices makes up the coding mode selection, which is then implemented during encode.

Figure 2:
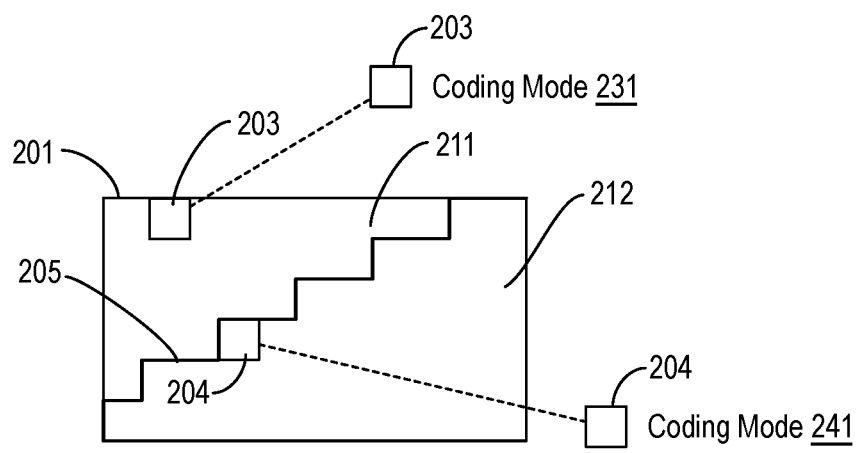
FIG. 2 illustrates an example video frame of video.

FIG. 2 illustrates an example video frame 201 of video 101, arranged in accordance with at least some implementations of the present disclosure. As shown, video frame 201 may be segmented into one or more blocks or portions as illustrated with respect to blocks 203, 204. Blocks 203, 204 may be further divided into coding or prediction sub-blocks and transform blocks during encode. In some embodiments, video frame 201 is segmented into coding blocks, which are segmented into transform blocks. However, any picture structure may be used that divides the frame into macroblocks, blocks, units, sub-units, etc. As used, herein, the term block may refer to any partition or sub-partition of a video picture that is at the sub-picture and sub-slice level. For example, a block may refer to a coding unit.

Furthermore, video frame 201 may be segmented by a parallel processing split boundary 205 such that coding mode decisions are made in parallel for one or more blocks in region 211 of video frame 201 (e.g., blocks above and to the left of parallel processing split boundary 205) and one or more blocks in region 212 of video frame 201 (e.g., blocks below and to the right of parallel processing split boundary 205). For example, coding mode decisions may be made for block 203 and block 204 at least partially in parallel. As used herein, the term parallel processing or similar terms indicate the processing overlaps temporally at least partially. For example, a first temporal window defined by a start and end time of a first task (e.g., coding mode decisions for a first block) at least partially overlaps with a second temporal window defined by a start and end time of a second task (e.g., coding mode decisions for a second block). In some embodiments, the start times of parallel tasks begin substantially simultaneously. However, any parallel processing context may be employed.

For each block of video frame 201, a coding mode is selected as illustrated with respect to coding mode 231 as selected for block 203 and coding mode 241 as selected for block 204. Notably, in response to block 204 being immediately adjacent to parallel processing split boundary 205, coding mode selection for block 204 divides block 204 into sub-blocks, employs disablement of skip check during motion estimation of the sub-blocks, evaluation of candidate motion vectors for each of the sub-blocks using distortion and coefficient coding cost but not motion vector coding during motion estimation, and skip check evaluation of block 204 using the motion vectors from the sub-block motion estimation, as discussed further herein. Furthermore, since block 203 (as well as many other blocks of video frame 201) is not immediately adjacent to parallel processing split boundary 205, other processing is performed during coding mode selection including division of block 203 into sub-blocks, enablement of skip check during motion estimation of the sub-blocks, evaluation of candidate motion vectors for each of the sub-blocks using distortion, coefficient coding cost, and motion vector coding during motion estimation, and skip check of block 203 using neighboring candidate motion vectors.

Coding modes 104 for video frame 201, including coding mode 231, coding mode 241, and so on are then provided to encode module 112 for use in encode of video frame 201. Notably, encode module 112 does not evaluate encode modes but performs sequential encode using coding modes 104.

Figures 3, 4:
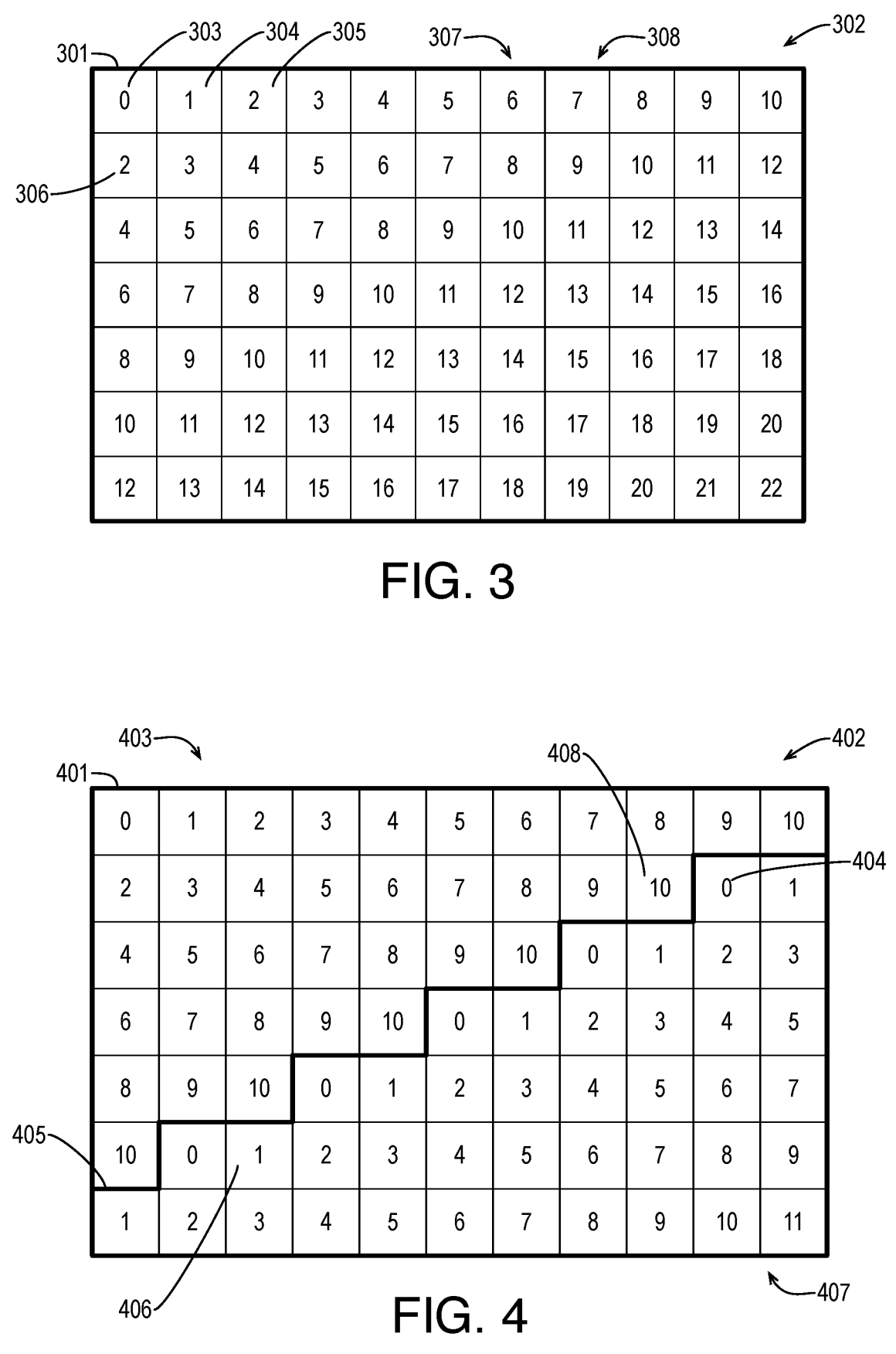

FIG. 3 illustrates example wavefronts as provided within a video frame 301, arranged in accordance with at least some implementations of the present disclosure. As shown, video frame 301 may be divided or partitioned into any number of blocks 302 of any suitable size such as 64×64 pixel blocks. In the illustrated example, video frame 301 is divided into 77 blocks for the sake of clarity of presentation. However, in practice, video frame 301 may be divided into hundreds or thousands of blocks. Furthermore, each of blocks 302 may be assigned to a wavefront such that coding mode decisions each of the blocks in a wavefront may be processed in parallel. For example, each wavefront may be established such that, prior to selecting a coding mode for each block, the coding modes are selected for all blocks above, to the left, and above and to the right of each block (except for those blocks on top and left boundaries of video frame). For example, block 303 is assigned to wavefront 0, block 304 is assigned to wavefront 1, and blocks 303, 304 cannot be processed (e.g., selection of a coding mode) in parallel with any other blocks. Blocks 305, 306 are assigned to wavefront 2 and can be processed in parallel after wavefront 1 is complete (i.e., after block 304 is processed), and so on such that each block number in FIG. 3 indicates a wavefront and each block in a wavefront can be processed in parallel. As a further example, wavefront 308, including four blocks each labeled with a 7, is processed after completion of wavefront 307, including four blocks each labeled with a 6. Such techniques exploit spatial dependency between blocks and, due to this dependency, coding mode selection of a particular block may start only after its neighbors, to the left and to the top, have been processed.

In the illustrated example, video frame 301 is divided into 23 wavefronts, with wavefronts 10 and 12 having a maximum number of blocks (six each) that can be processed in parallel. To further increase parallelism, a parallel processing split boundary or a wavefront boundary may be established such that repeated wavefronts are established for blocks below and to the right of the parallel processing split boundary with respect to blocks at the top left boundary of the frame. Such techniques provide increased parallelism in the video frame.

FIG. 4 illustrates example an example video frame 401 having wavefronts and an example parallel processing split boundary 405, arranged in accordance with at least some implementations of the present disclosure. As shown, video frame 401 may be divided or partitioned into any number of blocks 402 of any suitable size such as 64×64 pixel blocks. As with FIG. 3, in practice, video frame 401 may be divided into hundreds or thousands of blocks. Furthermore, parallel processing split boundary 405 is established within video frame 401. As used herein, the term parallel processing split boundary provides a boundary between blocks of a video frame such that, across the boundary, the assignment of blocks to wavefronts within the video frame is restarted. For example, at the top left boundary of video frame 401, wavefronts are established such that coding mode selection for a target block awaits coding mode selection for those blocks on which the target block depends. For example, all blocks in a zone 403 (e.g., a zone of video frame above and to the left of parallel processing split boundary 405) that are also in wavefront 4 must await coding mode decisions of wavefronts 0 to 3. Thereby, zone 403 is provided with spatially dependent wavefronts.

Parallel processing split boundary 405 breaks this dependency and restarts wavefronts 0 and 1 along and immediately adjacent to parallel processing split boundary 405. As used herein, the term immediately adjacent with respect to a boundary indicates the boundary shares an edge of a block. For example, block 404 is immediately adjacent to parallel processing split boundary 405 since the top and left edges of block 404 is shared with a portion of parallel processing split boundary 405. Similarly, block 406 is immediately adjacent to parallel processing split boundary 405 since the top edge of block 406 is shared with a portion of parallel processing split boundary 405. Such dependency breaking may also be illustrated with respect to block 404, which, without such dependency breaking, would need to await a coding mode decision from block 408. As shown, in zone 407, after the dependency break of parallel processing split boundary 405, such spatial dependency is resumed within zone 407. In some embodiments, parallel processing split boundary 405 is a wavefront parallel processing split boundary that defines parallel coding mode processing for first blocks above and to the left of the wavefront parallel processing split boundary with second blocks below and to the right of the wavefront parallel processing split boundary, as discussed herein.

It is noted that within zones 403, 407, wavefronts are numbered sequentially from left to right with each block having a left edge along a boundary beginning at a lowest available wavefront. For example, all blocks, including block 404, having a left edge immediately adjacent to parallel processing split boundary 405 is in wavefront 0 and blocks to the right are part of a wavefront in a sequentially increasing order.

Due to the discussed spatial dependency break, dramatically increased parallelism is attained. In video frame 401, all blocks labeled with the same wavefront may again be processed in parallel. As shown, the example of FIG. 4 has 12 wavefronts (reduced from 23 in the example of FIG. 3) with almost all wavefronts having the same length of seven blocks (a marked increase from the example of FIG. 3). In the illustrated embodiment, only one parallel processing split boundary 405 is illustrated. However, video frame 401 may include any number of parallel processing split boundaries for increased parallelism such as two, three, or four parallel processing split boundaries. For example, the split of video frame 401 into zones 403, 407 as defined by parallel processing split boundary 405 and then implementation of wavefronts in each of zones 403, 407 (along with the recognition that such wavefronts may also be in parallel), increases parallelization opportunities. The example of FIG. 4 twice reduces the number of wavefronts, makes each wavefront longer, and causes all wavefronts to be about the same length, increasing the number of blocks that can be processed in parallel. Thereby, coding mode decision performance for a frame may potentially double.

Figure 5:
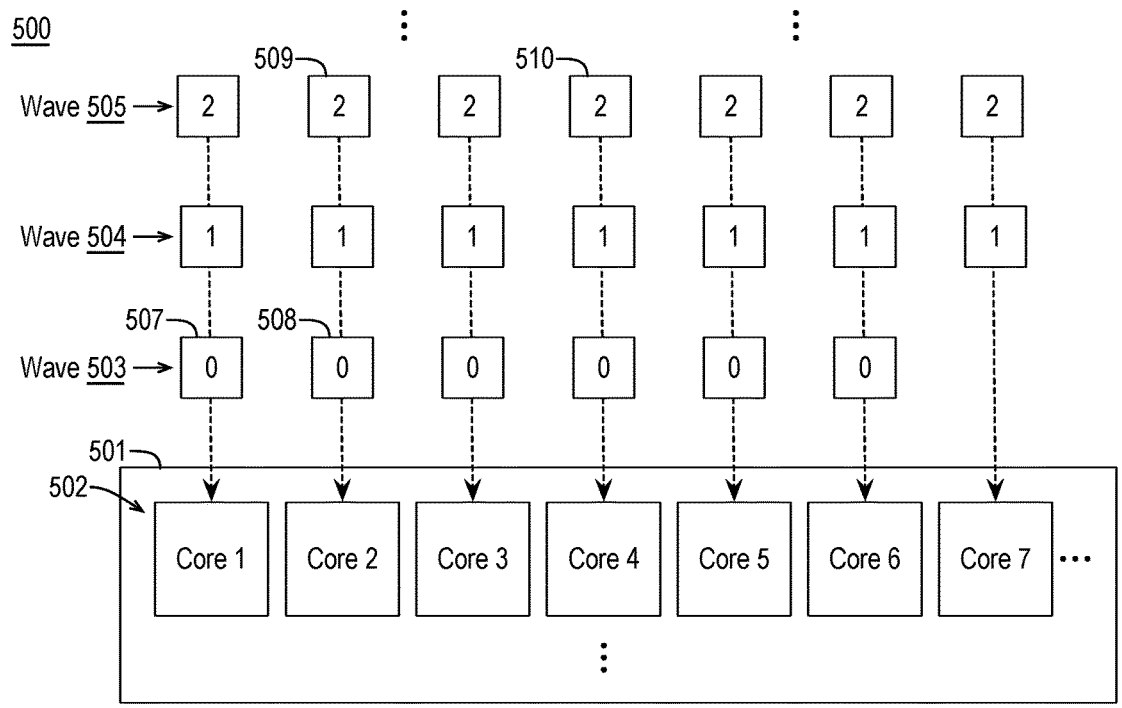
FIG. 5 illustrates exemplary parallel block coding mode selection.

FIG. 5 illustrates exemplary parallel block coding mode selection 500, arranged in accordance with at least some implementations of the present disclosure. As shown, parallel block coding mode selection 500 may be implemented by a multicore processor 501 including any number of processor cores 502. Multicore processor 501 may include any number of processor cores 502 and may implement any instruction set architecture. In some embodiments, multicore processor 501 is a CPU with multiple cores. In an embodiment, multicore processor 501 is a GPU with multiple cores. In an embodiment, multicore processor 501 is implemented via a monolithic integrated circuit. In an embodiment, multicore processor 501 is implemented via a monolithic field programmable gate array integrated circuit. As used herein, the term monolithic indicates a device that is discrete from other devices, although it may be coupled to other devices for communication and power supply.

As shown, each of waves of blocks including waves of blocks 503, 504, 505 are processed in parallel such that each block of a wave is processed separately and at least partially in parallel by one of processor cores 502. For example, block 507 and block 508 of wave of blocks 503 are processed at least partially in parallel by core 1 and core 2, respectively of processor cores 502 of multicore processor 501. Similarly, block 509 and block 510 of wave of blocks 505 are processed at least partially in parallel by core 2 and core 4, respectively of processor cores 502 of multicore processor 501, and so on. Such parallel processing may continue for all wavefronts of video frame 401 for example.

As discussed herein, blocks 507, 508, 509, 510 may undergo differing coding mode selection based on the location of blocks 507, 508, 509, 510 with respect to a parallel processing split boundary, is discussed further herein. For example, with reference to FIG. 4, block 507 may be immediately adjacent to parallel processing split boundary 405 and may undergo coding mode selection including disablement of skip check during motion estimation of the sub-blocks, evaluation of candidate motion vectors for each of the sub-blocks using distortion and coefficient coding cost but not motion vector coding during motion estimation, and skip check evaluation of block 507 using the motion vectors from the sub-block motion estimation. However, blocks 509, 510 may perform coding mode selection with skip check enabled for the sub-blocks (using neighboring motion vector candidates, for example), use of motion vector coding cost during motion estimation, and without use sub-block motion vectors for skip mode evaluation of the block.

In some embodiments, coding modes are selected at least partially in parallel for blocks including waves of blocks 503, 504, 505 by processor cores 502 and coding for blocks including waves of blocks 503, 504, 505 by processor cores 502 using the selected first and second coding modes is performed in series by multicore processor 501 or a second processor (not shown) that may be a multicore processor or a single core processor. Although discussed with respect to multicore parallel processing, any parallel processing discussed herein may be performed in parallel using separate processors or processing units.

Figure 6:
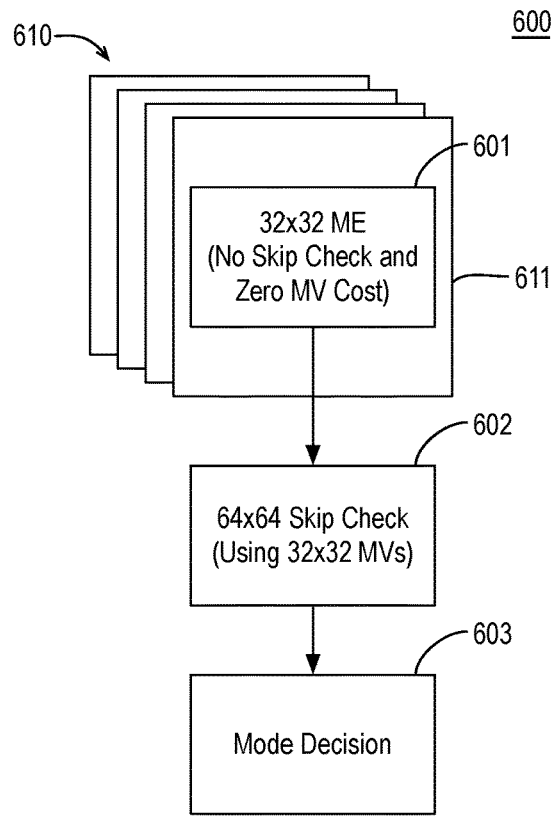
FIG. 6 illustrates exemplary block coding mode selection process for a block directly to the right and/or below a parallel processing split boundary.

FIG. 6 illustrates exemplary block coding mode selection process 600 for a block directly to the right and/or below a parallel processing split boundary, arranged in accordance with at least some implementations of the present disclosure. For example, with reference to FIG. 4, block coding mode selection process 600 may be performed for blocks in zone 407 that are in wavefront 0 and/or in wavefront 1. Such processing may also be performed for the wavefront 0 block in zone 403 (e.g., the top left block of video frame 401).

Notably, block coding mode selection process 600 may be performed for a first block in parallel with coding mode selection for a second block. The second block may perform the same block coding mode selection process 600 or it may perform a different process, depending on the location of the second block. In an embodiment, the first block is immediately adjacent to parallel processing split boundary 405 of video frame 401 and the second block is across parallel processing split boundary 405 from the first block.

As shown in FIG. 6, block coding mode selection process 600 may be performed in parallel for any number of blocks 610. For example, blocks 610 may be wavefront 0 blocks as discussed herein. For each of blocks 610, block coding mode selection process 600 may be performed in parallel at any number of processor cores of a multicore processor, for example. FIG. 6 illustrates at least part of a block coding mode selection process 600. After block coding mode selection process 600, blocks 610 are subsequently encoded via serial or sequential encode processing as discussed herein. In the example of FIG. 6, blocks 610 are 64×64 pixel blocks, however, any size blocks may be used. Furthermore, in FIG. 6, block coding mode selection process 600 is discussed with respect to exemplary block 611. However, it will be appreciated such processing is performed for each of blocks 610.

Block coding mode selection process 600 begins at operation 601 where sub-block motion estimation (32×32 ME) is performed for each of blocks 610 including block 611. For example, each of blocks 610 are first divided into sub-blocks. Blocks 610 may be divided into sub-blocks using any suitable technique or techniques. In an embodiment, blocks 610 are each 64×64 blocks and blocks 610 are each divided into four 32×32 sub-blocks. Furthermore, motion estimation as performed at operation 601 excludes use of skip check for each of the sub-blocks. For example, a skip check checks each sub-block to determine whether, using a particular motion vector, a skip mode is to be selected. Such skip mode selection is discussed herein with respect to FIG. 8. In summary, based on a candidate motion vector, a reference sub-block is retrieved. The reference sub-block is then differenced with the sub-block to generate a residual sub-block. The residual sub-block is transformed into the frequency domain and quantized to provide a coefficient block of transformed and quantized coefficients. A coefficient measurement for the sub-block is then generated (e.g., as a sum of squares or absolute values of the coefficients). If the coefficient measurement is less than a threshold, the skip mode would be selected for the sub-block. In response, only the pertinent motion vector would be coded for the sub-block with no residual being coded.

However, as discussed such processing is advantageously disabled for the sub-blocks of block 610. Thereby, for sub-blocks of block 610, which would have zero motion vectors as skip mode candidates, skip mode is not allowed. Such skip mode disablement provides for the need for block 610 (or its sub-blocks) to search for motion vectors, which is more likely to maintain a motion vector field across a wavefront boundary.

As shown, motion estimation as performed at operation 601 also excludes motion vector cost in the motion estimation search. For example, during motion estimation search (which may use any search areas and techniques), each available candidate motion vector (in the search) is evaluated based on a distortion corresponding to the candidate motion vector and a coding cost (rate) for coding transformed and quantized coefficients corresponding to the candidate motion vector but exclusive of a coding cost (rate) for coding the candidate motion vector itself. Notably, such techniques do not penalize large motion vectors or large motion vector delta between candidate motion vectors and a zero motion vector (as the sub-blocks have not inherited motion vectors from neighbors due to the lost spatial dependency). Thereby, more accurate and larger motion vectors are likely to be selected for the sub-blocks, which again provides a greater likelihood of maintaining a motion vector field across a wavefront boundary.

FIG. 7 illustrates a depiction of a portion of an exemplary block coding mode selection process 600 for example block 611, arranged in accordance with at least some implementations of the present disclosure. As shown in FIG. 7, block 611 (e.g., a 64×64 pixel block) is divided or partitioned into four 32×32 sub-blocks 711, 712, 713, 714. For example, dividing block 611 may include only a first level partitioning of block 611 into sub-blocks 711, 712, 713, 714 of the same size that are co-spatial block 611. That is, sub-blocks 711, 712, 713, 714, taken together, have the same spatial dimensions and include the same pixels as block 611.

As shown, motion estimation 730 is performed for each of sub-blocks 711, 712, 713, 714 (as illustrated with respect to only sub-block 712 for the sake of clarity of presentation). Motion estimation 730, as discussed with respect to FIG. 6, includes a disable skip mode selection operation 740. Disable skip mode selection operation 740 may be performed using any suitable technique or techniques such as indicating via a flag or disabling a flag for performance of skip mode. Furthermore, motion estimation 730 generates, for each of any number (e.g., 1 to N) of candidate motion vectors 731, 732, 733, a rate distortion measure 741 or a cost center measure or the like. Candidate motion vectors 731, 732, 733 may be determined using any suitable technique or techniques such as defining a motion search area or range or the like.

For each of candidate motion vectors 731, 732, 733, rate distortion measure 741 represents a weighted sum of distortion and rate such that one of candidate motion vectors 731, 732, 733 is selected having a lowest rate distortion measure 741 as shown with respect to selection of motion vector (MV) with lost rate distortion measurement operation 745. In an embodiment, each rate distortion measure 741 is a sum of a candidate sub-block distortion 742 (Disto) and a candidate transformed and quantized coefficient coding cost 744 (Coeff-Rate) multiplied by a Lagrange multiplier 743 (4 For example, for each of candidate motion vectors 731, 732, 733, a sub-block distortion is generated as a measure of a difference between sub-block 712 and a reference (e.g., reconstructed) sub-block corresponding to the motion vector. The sub-block distortion may be any suitable measurement such as a sum of squares of pixel-wise differences between pixels of the sub-block and pixels of the reference sub-block. Lagrange multiplier 743 may be any suitable value or function that represents an optimal slope between distortion and rate as is known in the art. Finally, the candidate transformed and quantized coefficient coding cost is a cost of coding the residual corresponding to the sub-block and the reference sub-block. For example, to determine the cost, the sub-block and the reference sub-block are differenced to generate a residual sub-block, the residual sub-block is transformed and quantized to generate coefficients, the coefficients are entropy encoded, and a number of bits of the encoded bitstream provides the cost. Notably, such entropy encoding or other aspects of the cost may be estimated for the sake of processing efficiency.

As shown with respect to operation 745, a motion vector 722 having a lowest rate distortion measure 741 is selected for sub-block 712. Using the same techniques, motion vectors 721, 723, 724 are selected for sub-blocks 711, 713, 714, respectively. Thereby, motion vectors 721, 722, 723, 724 are selected with skip check disabled and without use of motion vector coding cost for block 611.

Returning to FIG. 6, block coding mode selection process 600 continues at operation 602, where, for each of blocks 610, a skip check is performed using the sub-block motion vectors determined at operation 601. For example, since blocks 610 do not have pertinent neighboring motion vector information (due to the forced spatial dependency split), it may be advantageous to first perform a motion estimation search using sub-blocks and then to perform a skip check for each of blocks 610. In an embodiment, the skip check for each of blocks 610 is performed using each of the corresponding sub-block motion vectors. For example, using each motion vector as a candidate, a coefficients measure may be generated (e.g., one each for each candidate motion vector). For example, each coefficients measure or measurement may be generated by retrieving a reference (reconstructed) block for the candidate motion vector, differencing the reference block with the block to determine a residual block, transforming and quantizing the residual block to generate a coefficient block, and generating a coefficient measurement using the coefficient block (e.g., as a sum of squares of the coefficients). The lowest coefficients measure is then compared to a threshold. If the lowest coefficients measure is less than the threshold, a skip mode is assigned to the block and further coding mode evaluation may be bypassed (e.g., an early exit may be performed). Such techniques may provide reduced coding mode selection processing time without high losses in terms of quality. Furthermore, due to the skip mode being associated with a searched motion vector, visual artifacts in the decoded video are greatly reduced.

FIG. 8 is a flow diagram illustrating an example process 800 for performing a skip check for a block or sub-block, arranged in accordance with at least some implementations of the present disclosure. Process 800 may include one or more operations 801-810 as illustrated in FIG. 8. Process 800 may be performed by a device (e.g., system 100 as discussed herein) to perform a skip check for a block or sub-block. For example, process 800 is discussed with respect to a skip check for a block but may be applied, in the same manner, to a sub-block.

Processing begins at operation 801, where candidate motion vectors for skip mode evaluation of a block are received. For example, motion vectors 721, 722, 723, 724 generated via motion estimation of sub-blocks 711, 712, 713, 714, respectively, may be received for skip mode evaluation of block 611. Processing continues at operation 802, where a motion vector of the candidates is selected. Processing continues at operation 803, where, using the motion vector (and reference frame information, if applicable), a reference block such as a reconstructed reference block from a reconstructed reference frame is retrieved.

Processing continues at operation 804, where the block (e.g., block 611) and the reference block (e.g., the reconstructed reference block) are differenced to form a residual block and the residual block is transformed and quantized to generate a coefficient block. For example, the block and the reference block may be differenced in a pixel wise manner in the spatial domain to determine the residual block. The residual block is then transformed via discrete cosine transform or other transform to the spatial domain to generate a block of transform coefficients, which are quantized to determine a block of quantized transform coefficients, or simply a coefficient block.

Processing continues at operation 805, where a coefficients measure or measurement is generated using the block of quantized transform coefficients. The coefficients measurement may be determined using any suitable technique or techniques such as by summing squares of the quantized transform coefficients, summing absolute values of the quantized transform coefficients, or the like.

Processing continues at decision operation 806, where a determination as to whether the last candidate motion vector has been processed. If not, processing continues at operations 802-805 as discussed until a coefficients measure or measurement is generated for each candidate motion vector. After a coefficients measurement is determined for each candidate motion vector, processing continues at operation 807, where a candidate motion vector having a lowest coefficients measurement is selected. Processing continues at decision operation 808, where a determination is made as to whether the lowest coefficients measurement (LCM) is less than a predetermined threshold. The threshold may be any suitable value dependent on, for example, a quality level being implemented during encode. If not, processing continues at operation 810 where skip mode is not selected for the block.

If so, processing continues at operation 809, where skip mode is selected for the block and the motion vector selected at operation 807 is provided as the skip mode motion vector for the block. Notably, if skip mode is selected, additional coding mode selection operations for the block may be bypassed. For example, with reference to FIG. 6, if skip mode is selected at operation 602, no other coding modes are evaluated for the block.

With continuing reference to FIG. 6, block coding mode selection process 600 continues at operation 603, where, for each of blocks 610, a final coding mode decision is made. Operation 603 may include evaluation of any number of coding modes for each of blocks 610. For example, operation 603 may evaluate additional motion vectors for additional partitions (e.g., smaller sub-blocks as made by level 2 or additional partitionings of the blocks) of each of blocks 610, evaluation of intra modes for each of blocks 610, or the like. In some embodiments, when evaluating coding modes including motion vectors generated at operation 601, such modes are evaluated inclusive of motion vector coding cost e.g., a rate measurement for the cost of coding the candidate motion vector itself). For example, the coding cost for any of sub-blocks 711, 712, 713, 714 using any of motion vectors 721, 722, 723, 724 (or an overall cost for block 611) may include a sum of a distortion and a Lagrange multiplier multiplied by a sum of a transformed and quantized coefficient coding cost and a motion vector coding cost.

In some embodiments, determining final coding mode selection includes selection between a best inter coding mode and a best intra coding mode. For example, the best inter coding mode may include candidate motion vectors 721, 722, 723, 724 and may have a first rate distortion measurement including a distortion of block 611 using the best inter coding mode, a transform and quantized coefficient coding cost of block 611 using the best inter coding mode, and a motion vector coding cost of block 611 using the best inter coding mode. The best intra coding mode may have a second distortion measurement including a distortion of block 611 using the best intra coding mode and a coding cost of block 611 using the best intra coding mode.

Figure 9:
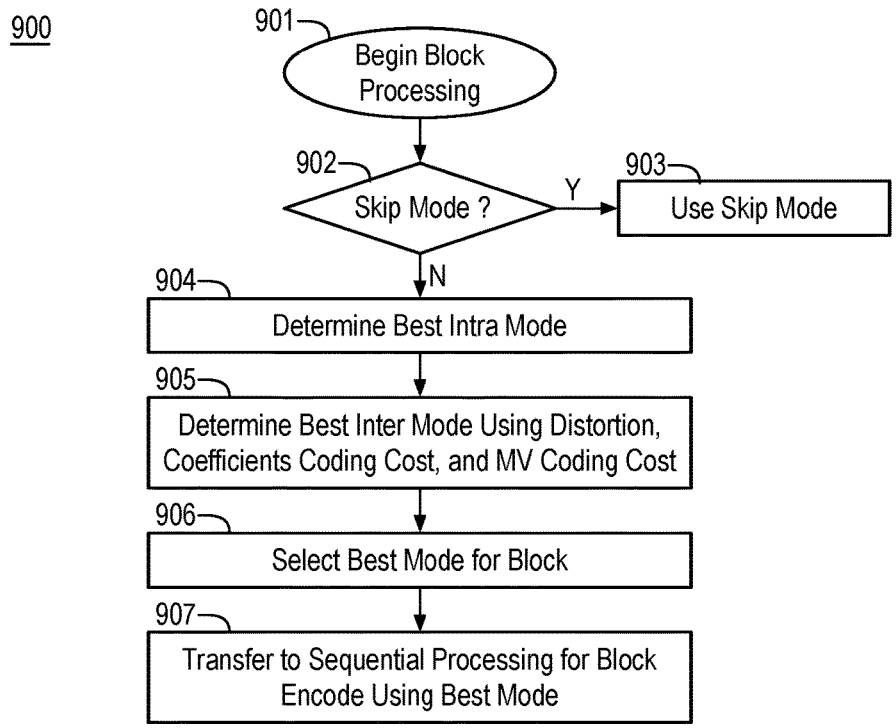
FIG. 9 is a flow diagram illustrating an example process for performing final coding mode selection for a block.

FIG. 9 is a flow diagram illustrating an example process 900 for performing final coding mode selection for a block, arranged in accordance with at least some implementations of the present disclosure. Process 900 may include one or more operations 901-907 as illustrated in FIG. 9. Process 900 may be performed by a device (e.g., system 100 as discussed herein) to perform a final mode selection for a block as discussed herein.

Processing begins at start operation 901, where coding mode selection for a block begins. Processing continues at decision operation 902, where a determination is made as to whether a skip mode is selected for the block (e.g., a operation 602). If so, process 900 ends at operation 903, where skip mode is selected as the final coding mode for the block. If not, processing continues at operation 904, where a best intra mode is determined for the block. The best intra mode may be determined using any suitable technique or techniques. In an embodiment, a best intra mode corresponds to a mode having a lowest rate distortion value where each rate distortion value for each one of the intra modes includes a sum of a distortion measurement (e.g., a sum of squares or absolute value differences based on the block and a predicted block predicted using the intra mode) and a Lagrange multiplier multiplied by a coding cost rate (e.g., based on a bit cost for coding the block using the intra mode).

Processing continues at operation 905, where a best inter mode is determined for the block is determined for the block. The best inter mode may be generated using any suitable technique or techniques and may include evaluation of an inter mode using motion vectors 721, 722, 723, 724 as well as motion vector searches for other size sub-blocks of the block. In some embodiments, the best inter mode corresponds to a mode having a lowest rate distortion value where each rate distortion value for each one of the inter modes includes a sum of a distortion measurement (e.g., a sum of squares or absolute value differences generated based on the block and a predicted block predicted using the inter mode) and a Lagrange multiplier multiplied by a coding cost rate (e.g., based on a bit cost for coding the block using the inter mode). Notably, at operation 905, the coding cost rate includes all coding costs including bits for coding resultant quantized transform coefficients and bits for coding the motion vectors.

Processing continues at operation 906, where a best mode is selected for the block. For example, the best mode may be selected as the intra mode or the inter mode having the lowest rate distortion value. Processing continues at operation 907, where the final coding mode is transferred to a sequential processor for block encode using the best mode. For example, as discussed herein, coding mode selection may be made in parallel while encode (without coding mode selection) is performed sequentially or in series for the blocks using, for example, a raster scan order.

As discussed, blocks immediately adjacent and after (with respect to moving from a top left to a bottom right of a video frame) a parallel processing split boundary or wavefront boundary (e.g., immediately below and/or to the right of the boundary) are processed in a manner that is different with respect to other blocks of the video frame as coding mode selections for neighboring blocks are not available for such blocks. However, other blocks, due to having neighboring coding mode selections available to them may be processed in a standard manner such as inclusive of enabling skip check for sub-blocks and use of motion vector coding cost or rate during motion estimation. Discussion now turns to coding mode selection for blocks that are not immediately below and/or to the right of a parallel processing split boundary. Notably, such coding mode selection may be performed in parallel with respect to modified coding mode selections as discussed herein.

Figure 10:
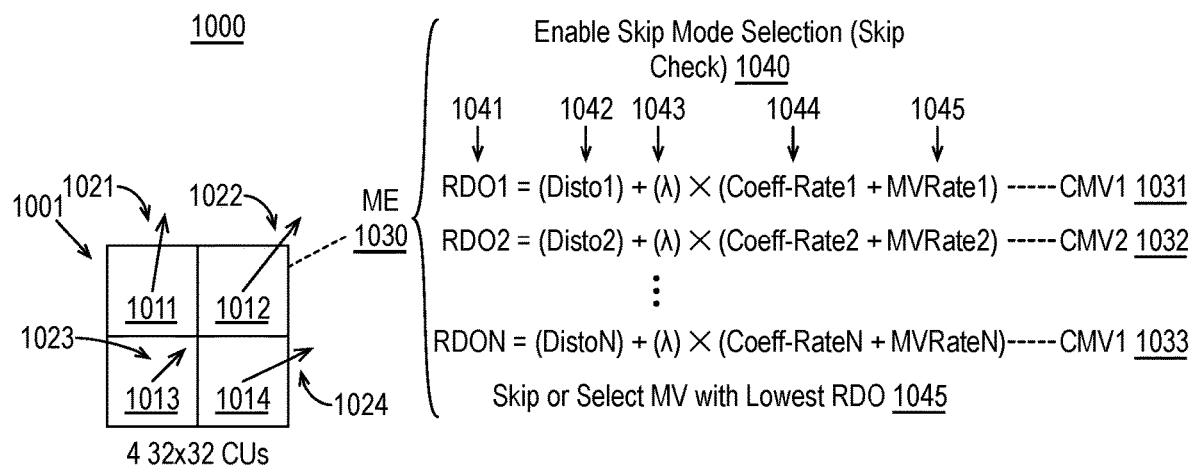
FIG. 10 illustrates a depiction of a portion of an exemplary block coding mode selection process for an example block.

FIG. 10 illustrates a depiction of a portion of an exemplary block coding mode selection process 1000 for an example block 1001, arranged in accordance with at least some implementations of the present disclosure. With reference to FIG. 4, block 1001 may be any block in wavefronts 2 through 10 such that during selection of a block coding mode, the coding mode decisions (e.g., motion estimation modes) of blocks neighboring and above and to the right of block 1001 are available during block coding mode selection process 1000. As shown in FIG. 10, block 1001 (e.g., a 64×64 pixel block) is divided or partitioned into four 32×32 sub-blocks 1011, 1012, 1013, 1014. For example, as with the partitioning of block 611, dividing or partitioning block 611 may include only a first level partitioning of block 611 into sub-blocks 1011, 1012, 1013, 1014 of the same size that are co-spatial block 1001. Motion estimation 1030 is then performed for sub-blocks 1011, 1012, 1013, 1014 such that skip mode selection is enabled and rate distortion optimization is performed using motion vector coding cost, as discussed further below. With reference to FIG. 6, it is noted that motion estimation 1030 and motion estimation 632 differ in that motion estimation 632 does not allow skip mode selection and motion vector coding costs are excluded from the mode selection.

Motion estimation 1030 is performed for each of sub-blocks 1011, 1012, 1013, 1014 (as illustrated with respect to sub-block 1012) such that motion estimation 1030 includes a skip mode selection operation 1040. Skip mode selection operation 1040 may be performed using any suitable technique or techniques. For example, candidate skip mode motion vectors may be attained as motion vectors selected for neighboring blocks of block 1001 (e.g., blocks above and to the left of block 1001) and such motion vectors may be optionally merged to generate a candidate list of motion vectors. Each motion vector may then be evaluated, using a skip check as discussed with respect to FIG. 8, for each of sub-blocks 1011, 1012, 1013, 1014. If a motion vector provides a valid skip for the sub-block, a skip mode may be selected and an indicator is provided to indicate the motion vector (e.g., a skip motion vector) and to indicate no residual is to be coded for the block. In some embodiments, responsive to a skip for the sub-block, an early exit to coding mode decision may also be applied such that no additional modes are evaluated for the sub-block. Such techniques may offer the advantages of fast computation and low bitrate while balancing impacts on visual quality.

If no valid skip motion vector is found for the sub-block, block coding mode selection process 1000 continues with the generation, for each of any number (e.g., 1 to N) of candidate motion vectors 1031, 1032, 1033, a rate distortion measure 1041 or a cost center measure or the like. Candidate motion vectors 1031, 1032, 1033 may be determined using any suitable technique or techniques such as defining a motion search area or range or the like. For each of candidate motion vectors 1031, 1032, 1033, rate distortion measure 1041 represents a weighted sum of distortion and rate such that one of candidate motion vectors 1031, 1032, 1033 is selected having a lowest rate distortion measure 1041 as shown with respect to selection of motion vector (MV) with lost rate distortion measurement operation 1045. In an embodiment, each rate distortion measure 1041 is a sum of a candidate sub-block distortion 1042 (Disto) and a Lagrange multiplier 1043 ($\lambda$) multiplied by a sum of a candidate transformed and quantized coefficient coding cost 1044 (Coeff-Rate) and a motion vector coding cost 1045 (MVRate). Candidate sub-block distortions 1042, candidate transformed and quantized coefficient coding costs 1044, and Lagrange multiplier 1043 may be determined as discussed with respect to FIG. 7. Motion vector coding cost 1045 may be generated by a cost of coding the corresponding candidate motion vectors 1031, 1032, 1033. For example, to determine the cost, the candidate motion vector and a motion vector for a neighboring block may be differenced to generate a residual motion vector, the residual motion vector entropy encoded, and a number of bits of the encoded bitstream provides the cost. As discussed with respect to FIG. 7, such entropy encoding or other aspects of the cost may be estimated for the sake of processing efficiency.

As shown with respect to operation 1045, a motion vector 1022 having a lowest rate distortion measure 1041 is selected for sub-block 1012. Using the same techniques, motion vectors 1021, 1023, 1024 are selected for sub-blocks 1011, 1013, 1014, respectively. Thereby, motion vectors 1021, 1022, 1023, 1024 are selected with skip check enabled and with use of motion vector coding cost for block 1011. It is noted that with respect to sub-blocks 1011, 1012, 1013, 1014, motion vectors 1021, 1022, 1023, 1024 may be motion vectors for a skip coding mode (e.g., where the motion vector is used to reference a reconstructed block but no residual is coded) or a motion compensation coding mode (e.g., where the motion vector is used to reference a reconstructed block and, in addition, a residual is coded).

Techniques discussed herein mitigate or eliminate artifacts due to parallel processing split boundaries applied to a video frame. Such techniques alter processing of blocks lying on the split boundary (e.g., immediately to the right and or below the boundary) to ensure preservation of motion as a whole for the reduction or elimination of visual artifacts including high frequency uttering and/or breaks across frame portions such as objects or backgrounds. Such techniques include, for example, disabling skip check and early exit during a 32×32 motion estimation stage for 64×64 input blocks to eliminate errors, ignoring motion vector cost during 32×32 motion estimation, performing skip check for the 64×64 input block using the four motion vectors from the 32×32 motion estimation stage as candidates, and performing final mode decision based on rate distortion cost to select the 64×64 mode, the 32×32 modes, or another mode.

Figure 11:
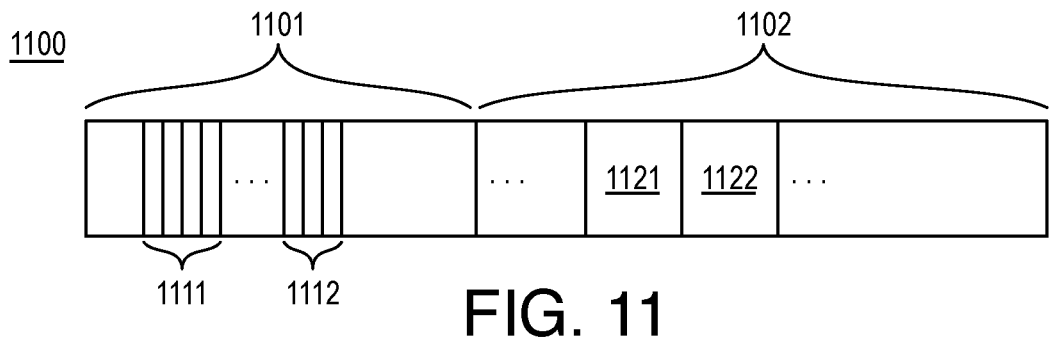
FIG. 11 illustrates an example bitstream.

FIG. 11 illustrates an example bitstream 1100, arranged in accordance with at least some implementations of the present disclosure. For example, bitstream 1100 may correspond to bitstream 105 herein. As shown in FIG. 11, in some embodiments, bitstream 1100 includes a header portion 1101 and a data portion 1102. Header portion 1101 may include mode decision indicators 1111, 1112 such as block or coding unit level coding mode decisions (and/or split information), and transform size indicators, and so on. For example, mode decision indicators 1111, 1112 may include coding mode decisions and partitionings of blocks of video that correspond to candidate coding structures as discussed herein including coding modes 104. Furthermore, data portion 1102 may include block data 1121, 1122, which may include motion vectors, transformed and quantized residual pixel values, etc. for portions or blocks of video data. In some embodiments, bitstream 1100 is a standard compliant bitstream. For example, bitstream 1100 may be HEVC compliant, AVC compliant, VVC compliant, VP8 compliant, VP9 compliant, AV1 compliant, or compliant with any other suitable codec. Notably, bitstream 1100 may be transmitted, stored, etc. for eventual decoding by a decoder.

Figure 12:
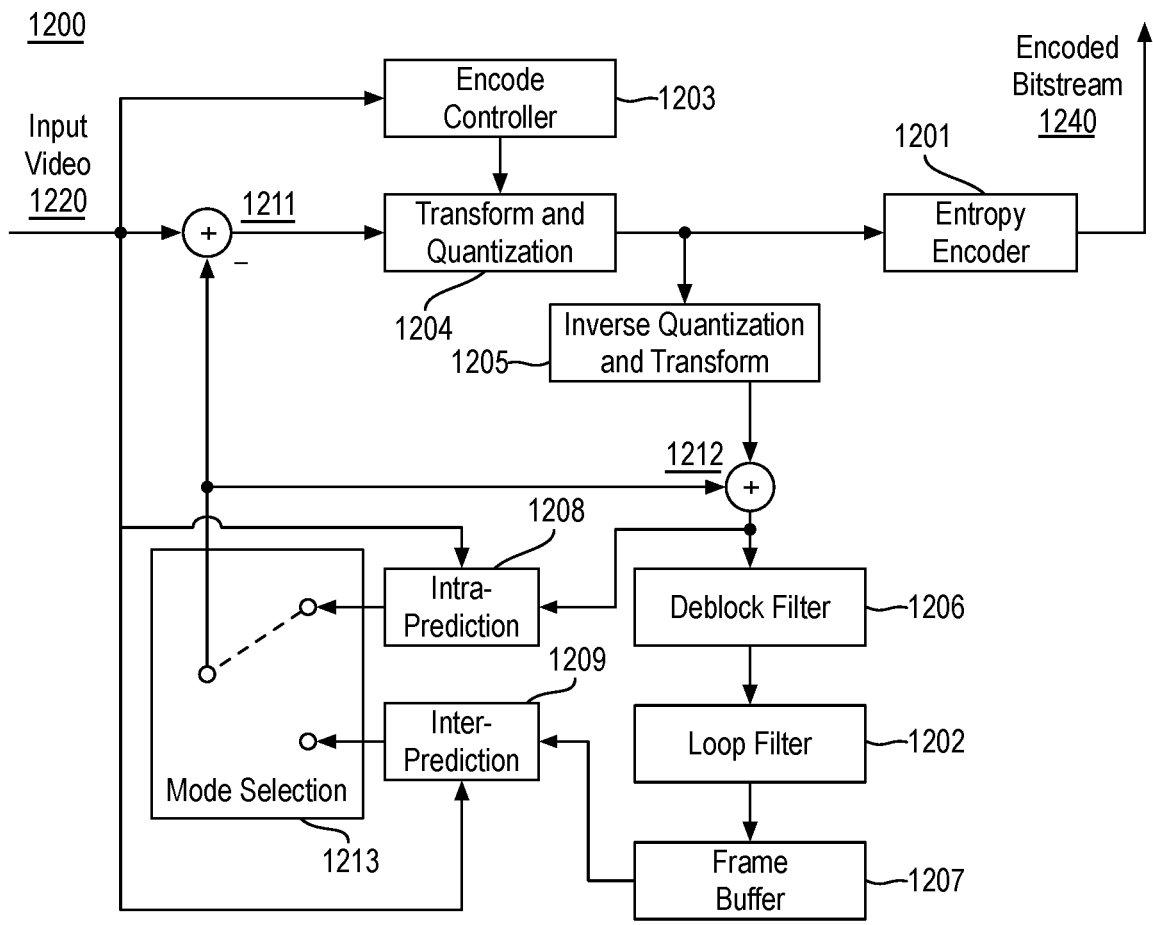
FIG. 12 illustrates a block diagram of an example encoder for performing video coding with parallel block coding mode decisions.

FIG. 12 illustrates a block diagram of an example encoder 1200 for performing video coding with parallel block coding mode decisions, arranged in accordance with at least some implementations of the present disclosure. As shown, encoder 1200 includes an entropy encoder 1201, a loop filter 1202, an encode controller 1203, a transform and quantization module 1204, an inverse quantization and transform module 1205, a deblock filter 1206, a frame buffer 1207, a mode selection module 1213, an intra-prediction module 1208, and an inter-prediction module 1209. Encoder 1200 may include additional modules and/or interconnections that are not shown for the sake of clarity of presentation. Notably, encoder 1200 may implement any of modules 111, 112. In an embodiment, encoder 1200 implements module via encode controller 1203 and module 112 via various components of encoder 1200 such that the illustrated input video 1220 is video 101.

As shown in FIG. 12, encoder 1200 receives input video 1220. Input video 1220 may be in any suitable format and may be received via any suitable technique such as downsampling of video 101, fetching from memory, transmission from another device, etc. As discussed, encode of input video 1220 is controlled, in part by encode controller 1203 such that various encode decisions for input video 1220 are made or influenced by the techniques discussed herein. For example, parallel block coding mode decisions may be implemented via encode controller 1203 using the techniques discussed herein. Frames of input video 1220 may be processed to determine coding portions of thereof (e.g., blocks, coding tree units, coding units, partitions etc.). As shown, input video 1220 may be provided to encode controller 1203, intra-prediction module 1208, and inter-prediction module 1209. The coupling to intra-prediction module 1208 or inter-prediction module 1209 may be made via mode selection module 1213 as shown. For example, mode selection module 1213 may make final mode decisions for portions of video frames of input video 1220, again, based on limited evaluation, searching, etc. as indicated by block level coding controls 1230.

As shown, mode selection module 1213 (e.g., via a switch), may select, for a coding unit or block or the like a coding mode responsive to an indicator or decision as previously made in parallel by encode controller 1203. For example, encode controller 1203 may make block coding mode decisions at least partially in parallel and the remaining modules of encoder 1200 may implement the coding mode decision. Based on the selected mode, a predicted portion of the video frame may be differenced via differencer 1211 with the original portion of the video frame (e.g., of block level coding controls 1230) to generate a residual. It is noted that such processing is not performed for skip mode, which skips such residual processing. The residual may be transferred to transform and quantization module 1204, which may transform (e.g., via a discrete cosine transform or the like) the residual to determine transform coefficients and quantize the transform coefficients using the frame level QP discussed herein. Such transform operations may be determined under control of block level coding controls 1230 and any partial split depth evaluation. The quantized transform coefficients may be encoded via entropy encoder 1201 into encoded bitstream 1240. Other data, such as motion vector residuals, modes data, transform size data, or the like may also be encoded and inserted into encoded bitstream 1240.

Furthermore, the quantized transform coefficients are inverse quantized and inverse transformed via inverse quantization and transform module 1205 to generate a reconstructed residual. The reconstructed residual may be combined with the aforementioned predicted portion at adder 1212 to form a reconstructed portion, which may be deblocked via deblock filter 1206 and in-loop filtered using loop filter 1202 to generate a reconstructed frame. The reconstructed frame is then saved to frame buffer 1207 and used for encoding other portions of the current or other video frames. Such processing may be repeated any additional frames of input video 1220.

Figure 13:
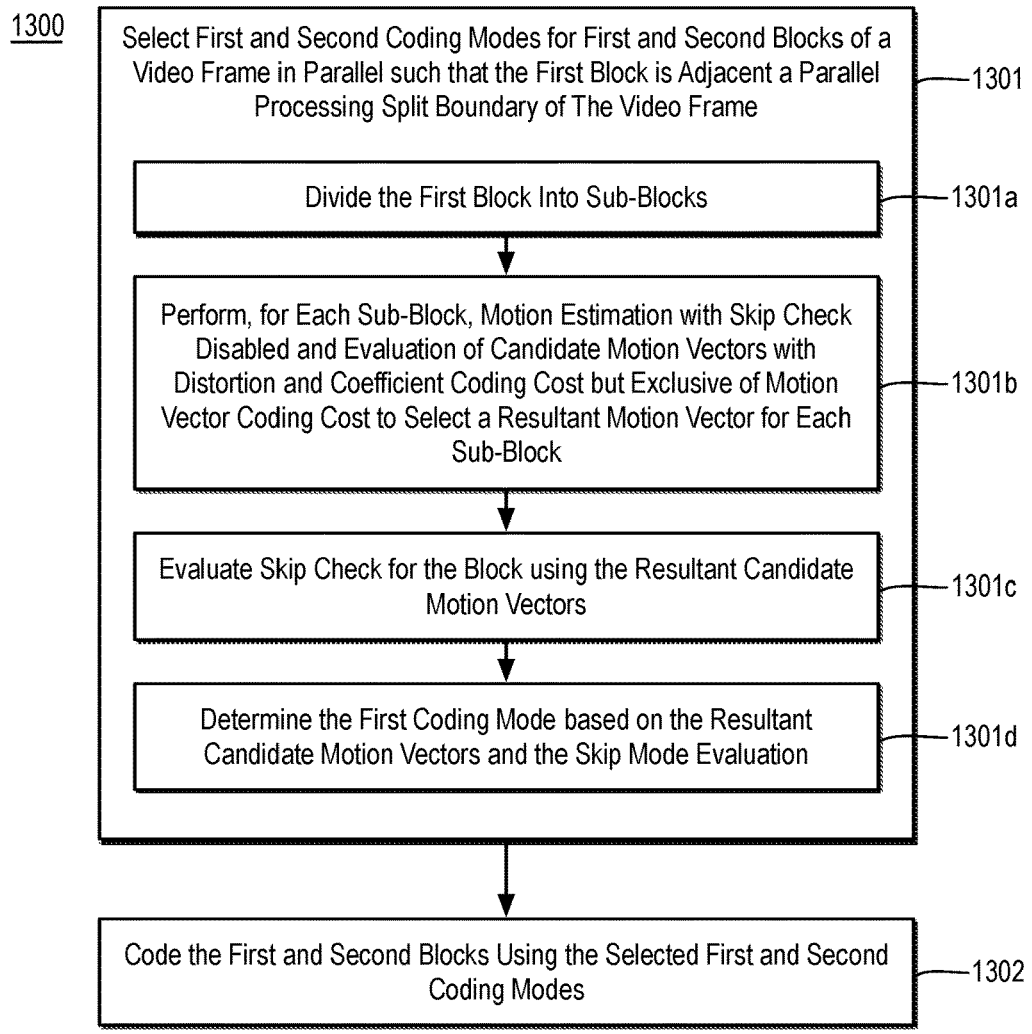
FIG. 13 is a flow diagram illustrating an example process for video coding.

FIG. 13 is a flow diagram illustrating an example process 1300 for video coding, arranged in accordance with at least some implementations of the present disclosure. Process 1300 may include one or more operations 1301-1302 as illustrated in FIG. 13. Process 1300 may form at least part of a video coding process. By way of non-limiting example, process 1300 may form at least part of a video coding process as performed by any device or system as discussed herein such as system 100 and/or encoder 1200. Furthermore, process 1300 will be described herein with reference to system 1400 of FIG. 14.

Figure 14:
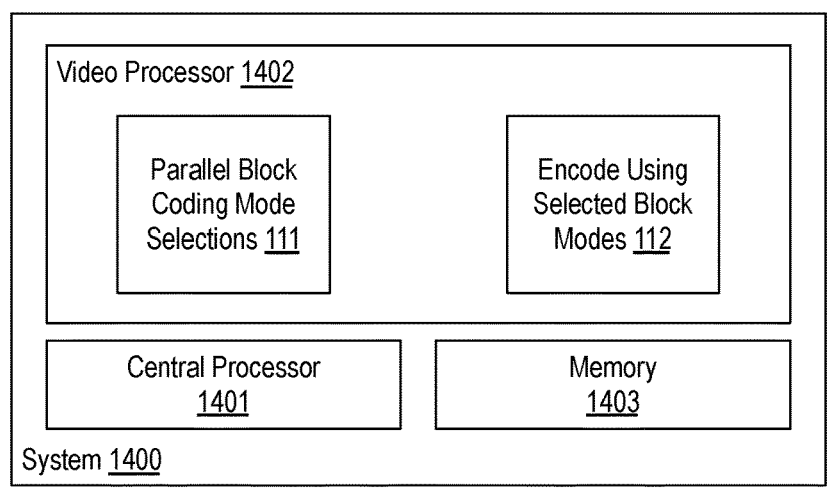
FIG. 14 is an illustrative diagram of an example system for video coding.

FIG. 14 is an illustrative diagram of an example system 1400 for video coding, arranged in accordance with at least some implementations of the present disclosure. As shown in FIG. 14, system 1400 may include a central processor 1401, a video processor 1402, and a memory 1403. Also as shown, video processor 1402 may include or parallel block coding mode selection module 111 and encode module 112. In an embodiment, memory 1403 implements frame buffer 1207. Furthermore, in the example of system 1400, memory 1403 may store video data or related content such as frame data, block data, block coding mode decision data, skip mode decision data, coding mode data, motion vector data, intra mode decision data, bitstream data, and/or any other data as discussed herein.

As shown, in some embodiments, parallel block coding mode selection module 111 and encode module 112 are implemented via video processor 1402. In other embodiments, one or more or portions of parallel block coding mode selection module 111 and encode module 112 are implemented via central processor 1401 or another processing unit such as an image processor, a graphics processor, or the like. Notably, parallel block coding mode selection module 111 may be advantageously implemented via a multicore processor as discussed herein. However, in some embodiments, parallel block coding mode decision processing may be performed in parallel on resources from different processors.

Video processor 1402 may include any number and type of video, image, or graphics processing units that may provide the operations as discussed herein. Such operations may be implemented via software or hardware or a combination thereof. For example, video processor 1402 may include circuitry dedicated to manipulate frames, frame data, or the like obtained from memory 1403. Central processor 1401 may include any number and type of processing units or modules that may provide control and other high level functions for system 1400 and/or provide any operations as discussed herein. Memory 1403 may be any type of memory such as volatile memory (e.g., Static Random Access Memory (SRAM), Dynamic Random Access Memory (DRAM), etc.) or non-volatile memory (e.g., flash memory, etc.), and so forth. In a non-limiting example, memory 1403 may be implemented by cache memory.

In an embodiment, one or more or portions of parallel block coding mode selection module 111 and encode module 112 are implemented via an execution unit (EU). The EU may include, for example, programmable logic or circuitry such as a logic core or cores that may provide a wide array of programmable logic functions. In an embodiment, one or more or portions of parallel block coding mode selection module 111 and encode module 112 are implemented via dedicated hardware such as fixed function circuitry or the like. Fixed function circuitry may include dedicated logic or circuitry and may provide a set of fixed function entry points that may map to the dedicated logic for a fixed purpose or function.

Returning to discussion of FIG. 13, process 1300 begins at operation 1301, where first and second coding modes are selected for first and second blocks of a video frame, respectively, at least partially in parallel. As shown, at least the first block is immediately adjacent to a parallel processing split boundary of the video frame. For example, the first block may be directly below, directly to the right, or both with respect to the parallel processing split boundary. In some embodiments, the parallel processing split boundary is at a top boundary of the first block, a left boundary of the first block, or both the top and left boundary of the first block. In some embodiments, the parallel processing split boundary is a wavefront parallel processing split boundary that defines parallel coding mode processing for first blocks above and to the left of the wavefront parallel processing split boundary with second blocks below and to the right of the wavefront parallel processing split boundary.

Therefore, the first block coding mode decision is made without information regarding the coding mode of neighbors of the first block due to the implementation of the parallel processing split boundary. In some embodiments, the second block is also immediately adjacent to the parallel processing split boundary. In such embodiments, the second block may be processed in the same manner as the first block. In other embodiments, the second block is not immediately adjacent to the parallel processing split boundary and the second block and the first block are differently processed. In some embodiments, the second block is across the parallel processing split boundary with respect to the first block such that the parallel processing split boundary is spatially between the first and second blocks.

As shown, operation 1301 may include operations 1301*a*-1301*d* performed with respect to the first block and/or the second. In the illustrated example, operations 1301*a*-1301*d* are applied with respect to the first block. For example, operations 1301*a*-1301*d* are applied to the first block in response to the relationship between the first block and the parallel processing split boundary of the video frame. Other blocks of the video frame not having the same relationship with respect to the parallel processing split boundary of the video frame are processed in a different manner in response thereto. That is, differential block coding mode selection is performed based on the relationship between a block and the parallel processing split boundary of the video frame. In an embodiment, only blocks that have the parallel processing split boundary at both their top and left boundary are processed as discussed with respect to operations 1301*a*-1301*d*.

As shown, processing of at least the first block may include operation 1301*a*, where the first block is divided into multiple sub-blocks. The first block may be divided into any number of sub-blocks using any suitable technique or techniques. In an embodiment, dividing the first block into sub-blocks includes only first level partitioning of the first block into sub-blocks of the same size that are co-spatial with the block. In an embodiment, the block is a 64×64 pixel block and each of the sub-blocks is a 32×32 pixel sub-block.

Processing continues at operation 1301*b*, where, for each of the sub-blocks generated at operation 1301*a*, motion estimation is performed such that the motion estimation includes disablement of skip check for each of the sub-blocks and evaluation of candidate motion vectors for each of the sub-blocks using sub-block to candidate sub-block distortion and transformed and quantized coefficient coding cost but exclusive of motion vector coding cost to select a resultant candidate motion vector for each of the sub-blocks. In some embodiments, evaluation of candidate motion vectors for each of the sub-blocks includes selecting, for a first sub-block of the sub-blocks, a first selected resultant candidate motion vector having a lowest rate distortion optimization value of a plurality of candidate rate distortion optimization values, each candidate rate distortion optimization value being a sum of a candidate sub-block distortion and a candidate transformed and quantized coefficient coding cost multiplied by a Lagrange multiplier.

Processing continues at operation 1301*c*, where skip check is evaluated for the block using each of the resultant candidate motion vectors for the sub-blocks. In some embodiments, evaluating skip check for the block includes determining, for each of the resultant candidate motion vectors, a reference block, differencing each reference block with the block to determine a plurality of residual blocks, transforming and quantizing each residual block to generate a plurality of coefficient blocks, generating a coefficient measurement using each coefficient block, and comparing a lowest coefficient measurement to a threshold.

Processing continues at operation 1301*d*, where the first coding mode for the first block is determined based on the resultant candidate motion vectors for the sub-blocks and the skip mode evaluation for the block. For example, the first coding mode may be a skip mode when the skip check evaluation indicates skip motion vector or a coding mode using the four motion vectors for the sub-blocks or another coding mode generated based on a final coding mode selection. In an embodiment, determining the first coding mode includes selection between a best inter coding mode and a best intra coding mode. For example, the best inter coding mode may include the resultant candidate motion vectors and may have a first rate distortion measurement including a distortion of the block using the best inter coding mode, a transform and quantized coefficient coding cost of the block using the best inter coding mode, and a motion vector coding cost of the block using the best inter coding mode. The best intra coding mode may have a second distortion measurement including a distortion of the block using the best intra coding mode and a coding cost of the block using the best intra coding mode. The best coding mode may be selected from any coding modes enabled by a standards based codec such as DC, planar, direction, etc. In an embodiment, the first coding mode is the one of the best inter coding mode and the best intra coding mode having the lowest rate distortion measurement (i.e., the coding mode corresponding to the smaller of the first and second rate distortion measurements).

Processing continues from operation 1301 at operation 1302, where the first and second blocks are coded using the selected first and second coding modes. In some embodiments, selecting the first and second coding modes at least partially in parallel includes processing the first and second blocks at first and second processor cores, respectively, of a multicore processor and coding the first and second blocks using the selected first and second coding modes is performed in series by the multicore processor or a second processor. The first and second blocks may be encoded using any suitable technique or techniques to generate a bitstream. In some embodiments, the bitstream is a standards based bitstream compliant with a coding standard or codec.

Process 1300 may be repeated any number of times either in series or in parallel for any number of blocks of a video frame, video frames, videos, pieces of video content. video segments, or the like.

Various components of the systems described herein may be implemented in software, firmware, and/or hardware and/or any combination thereof. For example, various components of the systems or devices discussed herein may be provided, at least in part, by hardware of a computing System-on-a-Chip (SoC) such as may be found in a computing system such as, for example, a smart phone. Those skilled in the art may recognize that systems described herein may include additional components that have not been depicted in the corresponding figures. For example, the systems discussed herein may include additional components such as bit stream multiplexer or de-multiplexer modules and the like that have not been depicted in the interest of clarity.

While implementation of the example processes discussed herein may include the undertaking of all operations shown in the order illustrated, the present disclosure is not limited in this regard and, in various examples, implementation of the example processes herein may include only a subset of the operations shown, operations performed in a different order than illustrated, or additional operations.

In addition, any one or more of the operations discussed herein may be undertaken in response to instructions provided by one or more computer program products. Such program products may include signal bearing media providing instructions that, when executed by, for example, a processor, may provide the functionality described herein. The computer program products may be provided in any form of one or more machine-readable media. Thus, for example, a processor including one or more graphics processing unit(s) or processor core(s) may undertake one or more of the blocks of the example processes herein in response to program code and/or instructions or instruction sets conveyed to the processor by one or more machine-readable media. In general, a machine-readable medium may convey software in the form of program code and/or instructions or instruction sets that may cause any of the devices and/or systems described herein to implement at least portions of the operations discussed herein and/or any portions the devices, systems, or any module or component as discussed herein.

As used in any implementation described herein, the term "module" refers to any combination of software logic, firmware logic, hardware logic, and/or circuitry configured to provide the functionality described herein. The software may be embodied as a software package, code and/or instruction set or instructions, and "hardware", as used in any implementation described herein, may include, for example, singly or in any combination, hardwired circuitry, programmable circuitry, state machine circuitry, fixed function circuitry, execution unit circuitry, and/or firmware that stores instructions executed by programmable circuitry. The modules may, collectively or individually, be embodied as circuitry that forms part of a larger system, for example, an integrated circuit (IC), system on-chip (SoC), and so forth.

Figure 15:
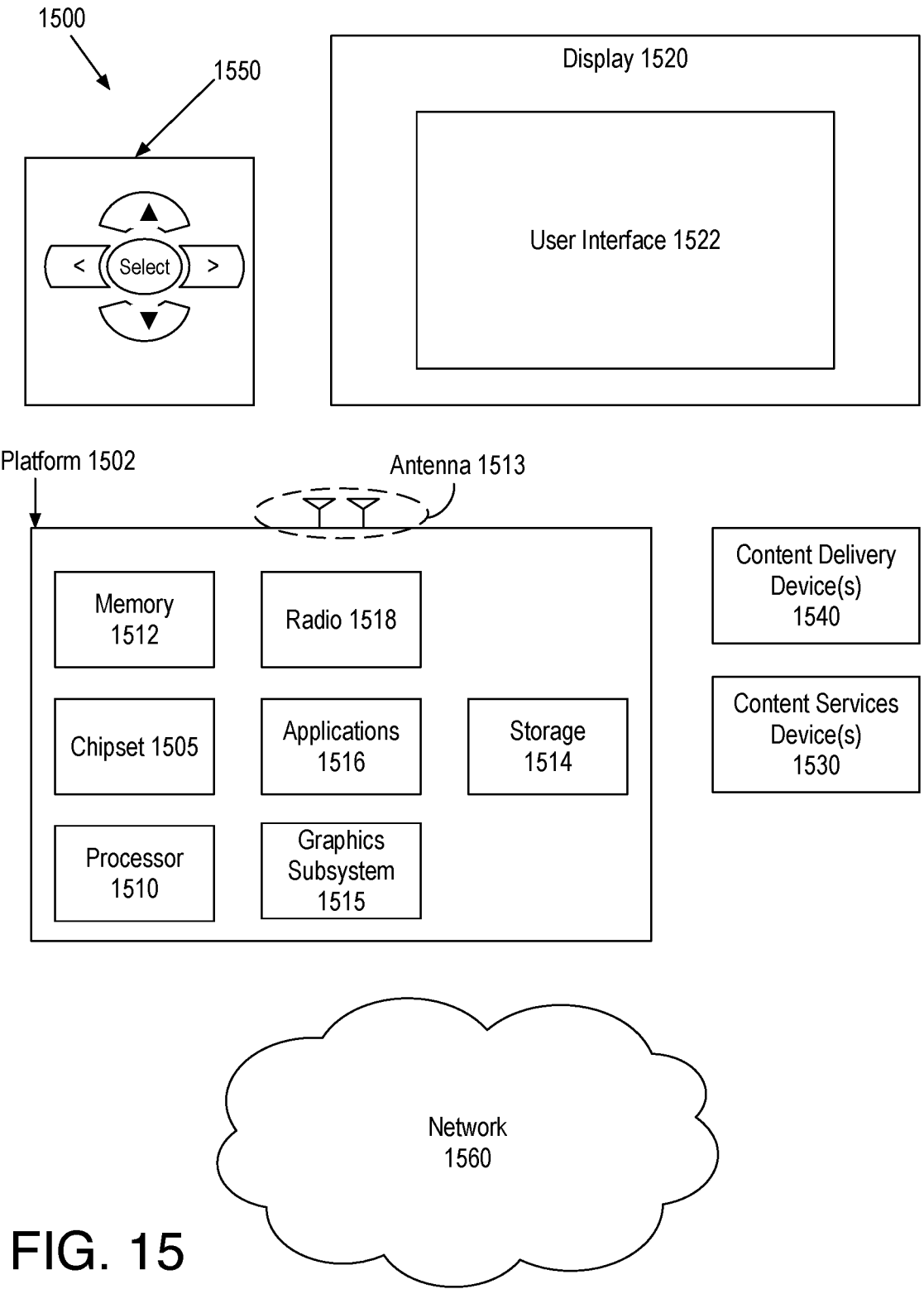
FIG. 15 is an illustrative diagram of an example system.

FIG. 15 is an illustrative diagram of an example system 1500, arranged in accordance with at least some implementations of the present disclosure. In various implementations, system 1500 may be a mobile system although system 1500 is not limited to this context. For example, system 1500 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, cameras (e.g. point-and-shoot cameras, super-zoom cameras, digital single-lens reflex (DSLR) cameras), and so forth.

In various implementations, system 1500 includes a platform 1502 coupled to a display 1520. Platform 1502 may receive content from a content device such as content services device(s) 1530 or content delivery device(s) 1540 or other similar content sources. A navigation controller 1550 including one or more navigation features may be used to interact with, for example, platform 1502 and/or display 1520. Each of these components is described in greater detail below.

In various implementations, platform 1502 may include any combination of a chipset 1505, processor 1510, memory 1512, antenna 1513, storage 1514, graphics subsystem 1515, applications 1516 and/or radio 1518. Chipset 1505 may provide intercommunication among processor 1510, memory 1512, storage 1514, graphics subsystem 1515, applications 1516 and/or radio 1518. For example, chipset 1505 may include a storage adapter (not depicted) capable of providing intercommunication with storage 1514.

Processor 1510 may be implemented as a Complex Instruction Set Computer (CISC) or Reduced Instruction Set Computer (RISC) processors, x86 instruction set compatible processors, multi-core, or any other microprocessor or central processing unit (CPU). In various implementations, processor 1510 may be dual-core processor(s), dual-core mobile processor(s), and so forth.

Memory 1512 may be implemented as a volatile memory device such as, but not limited to, a Random Access Memory (RAM), Dynamic Random Access Memory (DRAM), or Static RAM (SRAM).

Storage 1514 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 1514 may include technology to increase the storage performance enhanced protection for valuable digital media when multiple hard drives are included, for example.

Graphics subsystem 1515 may perform processing of images such as still or video for display. Graphics subsystem 1515 may be a graphics processing unit (GPU) or a visual processing unit (VPU), for example. An analog or digital interface may be used to communicatively couple graphics subsystem 1515 and display 1520. For example, the interface may be any of a High-Definition Multimedia Interface, DisplayPort, wireless HDMI, and/or wireless HD compliant techniques. Graphics subsystem 1515 may be integrated into processor 1510 or chipset 1505. In some implementations, graphics subsystem 1515 may be a stand-alone device communicatively coupled to chipset 1505.

The graphics and/or video processing techniques described herein may be implemented in various hardware architectures. For example, graphics and/or video functionality may be integrated within a chipset. Alternatively, a discrete graphics and/or video processor may be used. As still another implementation, the graphics and/or video functions may be provided by a general purpose processor, including a multi-core processor. In further embodiments, the functions may be implemented in a consumer electronics device.

Radio 1518 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 1518 may operate in accordance with one or more applicable standards in any version.

In various implementations, display 1520 may include any television type monitor or display. Display 1520 may include, for example, a computer display screen, touch screen display, video monitor, television-like device, and/or a television. Display 1520 may be digital and/or analog. In various implementations, display 1520 may be a holographic display. Also, display 1520 may be a transparent surface that may receive a visual projection. Such projections may convey various forms of information, images, and/or objects. For example, such projections may be a visual overlay for a mobile augmented reality (MAR) application. Under the control of one or more software applications 1516, platform 1502 may display user interface 1522 on display 1520.

In various implementations, content services device(s) 1530 may be hosted by any national, international and/or independent service and thus accessible to platform 1502 via the Internet, for example. Content services device(s) 1530 may be coupled to platform 1502 and/or to display 1520. Platform 1502 and/or content services device(s) 1530 may be coupled to a network 1560 to communicate (e.g., send and/or receive) media information to and from network 1560. Content delivery device(s) 1540 also may be coupled to platform 1502 and/or to display 1520.

In various implementations, content services device(s) 1530 may include a cable television box, personal computer, network, telephone, Internet enabled devices or appliance capable of delivering digital information and/or content, and any other similar device capable of uni-directionally or bi-directionally communicating content between content providers and platform 1502 and/display 1520, via network 1560 or directly. It will be appreciated that the content may be communicated uni-directionally and/or bi-directionally to and from any one of the components in system 1500 and a content provider via network 1560. Examples of content may include any media information including, for example, video, music, medical and gaming information, and so forth.

Content services device(s) 1530 may receive content such as cable television programming including media information, digital information, and/or other content. Examples of content providers may include any cable or satellite television or radio or Internet content providers. The provided examples are not meant to limit implementations in accordance with the present disclosure in any way.

In various implementations, platform 1502 may receive control signals from navigation controller 1550 having one or more navigation features. The navigation features of may be used to interact with user interface 1522, for example. In various embodiments, navigation may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features may be replicated on a display (e.g., display 1520) by movements of a pointer, cursor, focus ring, or other visual indicators displayed on the display. For example, under the control of software applications 1516, the navigation features located on navigation may be mapped to virtual navigation features displayed on user interface 1522, for example. In various embodiments, may not be a separate component but may be integrated into platform 1502 and/or display 1520. The present disclosure, however, is not limited to the elements or in the context shown or described herein.

In various implementations, drivers (not shown) may include technology to enable users to instantly turn on and off platform 1502 like a television with the touch of a button after initial boot-up, when enabled, for example. Program logic may allow platform 1502 to stream content to media adaptors or other content services device(s) 1530 or content delivery device(s) 1540 even when the platform is turned "off" In addition, chipset 1505 may include hardware and/or software support for 5.1 surround sound audio and/or high definition 7.1 surround sound audio, for example. Drivers may include a graphics driver for integrated graphics platforms. In various embodiments, the graphics driver may include a peripheral component interconnect (PCI) Express graphics card.

In various implementations, any one or more of the components shown in system 1500 may be integrated. For example, platform 1502 and content services device(s) 1530 may be integrated, or platform 1502 and content delivery device(s) 1540 may be integrated, or platform 1502, content services device(s) 1530, and content delivery device(s) 1540 may be integrated, for example. In various embodiments, platform 1502 and display 1520 may be an integrated unit. Display 1520 and content service device(s) 1530 may be integrated, or display 1520 and content delivery device(s) 1540 may be integrated, for example. These examples are not meant to limit the present disclosure.

In various embodiments, system 1500 may be implemented as a wireless system, a wired system, or a combination of both. When implemented as a wireless system, system 1500 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 1500 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 1502 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 15.

Figure 16:
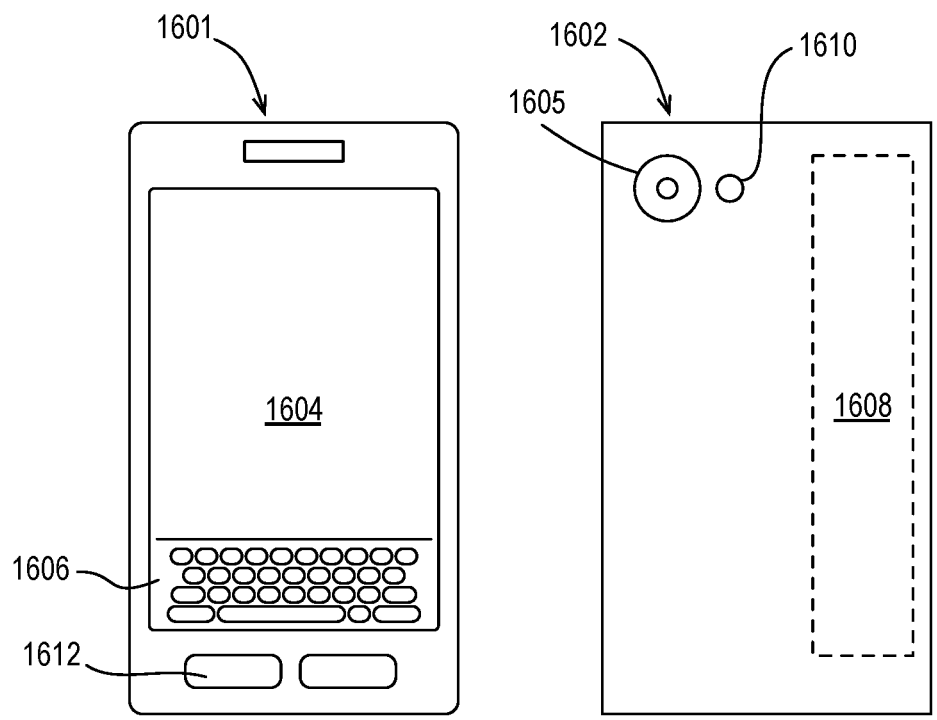
FIG. 16 illustrates an example device, all arranged in accordance with at least some implementations of the present disclosure.

As described above, system 1500 may be embodied in varying physical styles or form factors. FIG. 16 illustrates an example small form factor device 1600, arranged in accordance with at least some implementations of the present disclosure. In some examples, system 1500 may be implemented via device 1600. In other examples, system 100 or portions thereof may be implemented via device 1600. In various embodiments, for example, device 1600 may be implemented as a mobile computing device a having wireless capabilities. A mobile computing device may refer to any device having a processing system and a mobile power source or supply, such as one or more batteries, for example.

Examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, smart device (e.g., smart phone, smart tablet or smart mobile television), mobile internet device (MID), messaging device, data communication device, cameras, and so forth.

Examples of a mobile computing device also may include computers that are arranged to be worn by a person, such as a wrist computers, finger computers, ring computers, eyeglass computers, belt-clip computers, arm-band computers, shoe computers, clothing computers, and other wearable computers. In various embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 16, device 1600 may include a housing with a front 1601 and a back 1602. Device 1600 includes a display 1604, an input/output (I/O) device 1606, and an integrated antenna 1608. Device 1600 also may include navigation features 1612. I/O device 1606 may include any suitable I/O device for entering information into a mobile computing device. Examples for I/O device 1606 may include an alphanumeric keyboard, a numeric keypad, a touch pad, input keys, buttons, switches, microphones, speakers, voice recognition device and software, and so forth. Information also may be entered into device 1600 by way of microphone (not shown), or may be digitized by a voice recognition device. As shown, device 1600 may include a camera 1605 (e.g., including a lens, an aperture, and an imaging sensor) and a flash 1610 integrated into back 1602 (or elsewhere) of device 1600. In other examples, camera 1605 and flash 1610 may be integrated into front 1601 of device 1600 or both front and back cameras may be provided. Camera 1605 and flash 1610 may be components of a camera module to originate image data processed into streaming video that is output to display 1604 and/or communicated remotely from device 1600 via antenna 1608 for example.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as IP cores may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

In one or more first embodiments, a method for video coding comprises selecting first and second coding modes for first and second blocks of a video frame, respectively, at least partially in parallel, wherein the first block is immediately adjacent to a parallel processing split boundary of the video frame, and wherein selecting the coding mode for the first block comprises dividing the first block into a plurality of sub-blocks, performing, for each of the sub-blocks, motion estimation comprising disablement of skip check for each of the sub-blocks and evaluation of candidate motion vectors for each of the sub-blocks using sub-block to candidate sub-block distortion and transformed and quantized coefficient coding cost but exclusive of motion vector coding cost to select a resultant candidate motion vector for each of the sub-blocks, evaluating skip check for the block using each of the resultant candidate motion vectors for the sub-blocks, and determining the first coding mode based at least in part on the resultant candidate motion vectors for the sub-blocks and the skip mode evaluation for the block, and coding the first and second blocks using the selected first and second coding modes to generate a bitstream.

In one or more second embodiments, further to the first embodiment, selecting the second coding mode for the second block at least partially in parallel with selecting the first coding mode of the first block comprises dividing the second block into a plurality of second sub-blocks and performing, for each of the second sub-blocks, motion estimation comprising enablement of skip check for each of the second sub-blocks and evaluation of neighboring candidate motion vectors for each of the sub-blocks using sub-block to candidate sub-block distortion, transformed and quantized coefficient coding cost, and motion vector coding cost to select a second resultant candidate motion vector for each of the second sub-blocks.

In one or more third embodiments, further to the first or second embodiments, said evaluation of candidate motion vectors for each of the sub-blocks comprises selecting, for a first sub-block of the sub-blocks, a first selected resultant candidate motion vector having a lowest rate distortion optimization value of a plurality of candidate rate distortion optimization values, each candidate rate distortion optimization value being a sum of a candidate sub-block distortion and a candidate transformed and quantized coefficient coding cost multiplied by a Lagrange multiplier.

In one or more fourth embodiments, further to any of the first through third embodiments, said skip check for the block comprises differencing each reference block with the block to determine a plurality of residual blocks, transforming and quantizing each residual block to generate a plurality of coefficient blocks, generating a coefficient measurement using each coefficient block, and comparing a lowest coefficient measurement to a threshold.

In one or more fifth embodiments, further to any of the first through fourth embodiments, said dividing the first block into a plurality of sub-blocks comprises only first level partitioning of the first block into sub-blocks of the same size that are co-spatial with the block.

In one or more sixth embodiments, further to any of the first through fifth embodiments, the block is a 64×64 pixel block and each of the sub-blocks is a 32×32 pixel sub-block.

In one or more seventh embodiments, further to any of the first through sixth embodiments, said determining the first coding mode comprises selection between a best inter coding mode and a best intra coding mode, wherein the best inter coding mode comprises the resultant candidate motion vectors and has a first rate distortion measurement comprising a distortion of the block using the best inter coding mode, a transform and quantized coefficient coding cost of the block using the best inter coding mode, and a motion vector coding cost of the block using the best inter coding mode, and wherein the best intra coding mode has a second distortion measurement comprising a distortion of the block using the best intra coding mode and a coding cost of the block using the best intra coding mode.

In one or more eighth embodiments, further to any of the first through seventh embodiments, the parallel processing split boundary is at one of a top boundary of the first block or a left boundary of the first block.

In one or more ninth embodiments, further to any of the first through eighth embodiments, the parallel processing split boundary comprises a wavefront parallel processing split boundary that defines parallel coding mode processing for first blocks above and to the left of the wavefront parallel processing split boundary with second blocks below and to the right of the wavefront parallel processing split boundary.

In one or more tenth embodiments, further to any of the first through ninth embodiments, said selecting the first and second coding modes at least partially in parallel comprises processing the first and second blocks at first and second processor cores, respectively, of a multicore processor and wherein coding the first and second blocks using the selected first and second coding modes is performed in series by the multicore processor or a second processor.

In one or more eleventh embodiments, a device or system includes a memory and a processor to perform a method according to any one of the above embodiments.

In one or more twelfth embodiments, at least one machine readable medium includes a plurality of instructions that in response to being executed on a computing device, cause the computing device to perform a method according to any one of the above embodiments.

In one or more thirteenth embodiments, an apparatus includes means for performing a method according to any one of the above embodiments.

It will be recognized that the embodiments are not limited to the embodiments so described, but can be practiced with modification and alteration without departing from the scope of the appended claims. For example, the above embodiments may include specific combination of features. However, the above embodiments are not limited in this regard and, in various implementations, the above embodiments may include the undertaking only a subset of such features, undertaking a different order of such features, undertaking a different combination of such features, and/or undertaking additional features than those features explicitly listed. The scope of the embodiments should, therefore, be determined with reference to the appended claims, along with the full scope of equivalents to which such claims are entitled.

What is claimed is:

1. A device for video coding, comprising:
   a memory to store a video; and
   one or more processors coupled to the memory, the one or more processors to:
   select first and second coding modes for first and second blocks of a video frame, respectively, at least partially in parallel, wherein the first block is immediately adjacent to a parallel processing split boundary of the video frame, wherein the parallel processing split boundary comprises a wavefront parallel processing split boundary that defines parallel coding mode processing for first blocks above and to the left of the wavefront parallel processing split boundary with second blocks below and to the right of the wavefront parallel processing split boundary, and wherein the one or more processors to select the coding mode for the first block comprises the one or more processors to:
   divide the first block into a plurality of sub-blocks;
   perform, for each of the sub-blocks, motion estimation comprising disablement of skip check for each of the sub-blocks and evaluation of candidate motion vectors for each of the sub-blocks using sub-block to candidate sub-block distortion and transformed and quantized coefficient coding cost but exclusive of motion vector coding cost to select a resultant candidate motion vector for each of the sub-blocks;
   evaluate skip check for the first block using each of the resultant candidate motion vectors for the sub-blocks; and
   determine the first coding mode based at least in part on the resultant candidate motion vectors for the sub-blocks and the skip check evaluation for the first block; and
   code the first and second blocks using the selected first and second coding modes to generate a bitstream.

2. The device of claim 1, wherein the one or more processors to select the second coding mode for the second block at least partially in parallel with selection of the first coding mode of the first block comprises the one or more processors to:
   divide the second block into a plurality of second sub-blocks; and
   perform, for each of the second sub-blocks, motion estimation comprising enablement of skip check for each of the second sub-blocks and evaluation of neighboring candidate motion vectors for each of the sub-blocks using sub-block to candidate sub-block distortion, transformed and quantized coefficient coding cost, and motion vector coding cost to select a second resultant candidate motion vector for each of the second sub-blocks.

3. The device of claim 1, wherein said evaluation of candidate motion vectors for each of the sub-blocks comprises the one or more processors to select, for a first sub-block of the sub-blocks, a first selected resultant candidate motion vector having a lowest rate distortion optimization value of a plurality of candidate rate distortion optimization values, each candidate rate distortion optimization value being a sum of a candidate sub-block distortion and a candidate transformed and quantized coefficient coding cost multiplied by a Lagrange multiplier.

4. The device of claim 1, wherein said skip check for the block comprises the one or more processors to:
   determine, for each of the resultant candidate motion vectors, a reference block;
   difference each reference block with the block to determine a plurality of residual blocks;
   transform and quantizing each residual block to generate a plurality of coefficient blocks;
   generate a coefficient measurement using each coefficient block; and
   compare a lowest coefficient measurement to a threshold.

5. The device of claim 1, wherein the one or more processors to divide the first block into a plurality of sub-blocks comprises only first level partitioning of the first block into sub-blocks of the same size that are co-spatial with the block.

6. The device of claim 1, wherein the block is a 64×64 pixel block and each of the sub-blocks is a 32×32 pixel sub-block.

7. The device of claim 1, wherein the one or more processors to determine the first coding mode comprises the one or more processors to select between a best inter coding mode and a best intra coding mode, wherein the best inter coding mode comprises the resultant candidate motion vectors and has a first rate distortion measurement comprising a distortion of the block using the best inter coding mode, a transform and quantized coefficient coding cost of the block using the best inter coding mode, and a motion vector coding cost of the block using the best inter coding mode, and wherein the best intra coding mode has a second distortion measurement comprising a distortion of the block using the best intra coding mode and a coding cost of the block using the best intra coding mode.

8. The device of claim 1, wherein the parallel processing split boundary is at one of a top boundary of the first block or a left boundary of the first block.

9. The device of claim 1, wherein the one or more processors comprises a multicore processor and a second processor, wherein the one or more processors to select the first and second coding modes at least partially in parallel comprises the multicore processor to process the first block via a first processor core and to process the second block via a second processor core, and wherein the one or more processors to code the first and second blocks using the selected first and second coding modes comprises the second processor to code the first and second blocks in series.

10. A method for video coding comprising:
selecting first and second coding modes for first and second blocks of a video frame, respectively, at least partially in parallel, wherein the first block is immediately adjacent to a parallel processing split boundary of the video frame, wherein the parallel processing split boundary comprises a wavefront parallel processing split boundary that defines parallel coding mode processing for first blocks above and to the left of the wavefront parallel processing split boundary with second blocks below and to the right of the wavefront parallel processing split boundary, and wherein selecting the coding mode for the first block comprises:
dividing the first block into a plurality of sub-blocks;
performing, for each of the sub-blocks, motion estimation comprising disablement of skip check for each of the sub-blocks and evaluation of candidate motion vectors for each of the sub-blocks using sub-block to candidate sub-block distortion and transformed and quantized coefficient coding cost but exclusive of motion vector coding cost to select a resultant candidate motion vector for each of the sub-blocks;
evaluating skip check for the first block using each of the resultant candidate motion vectors for the sub-blocks; and
determining the first coding mode based at least in part on the resultant candidate motion vectors for the sub-blocks and the skip check evaluation for the first block; and
coding the first and second blocks using the selected first and second coding modes to generate a bitstream.

11. The method of claim 10, wherein selecting the second coding mode for the second block at least partially in parallel with selecting the first coding mode of the first block comprises:
dividing the second block into a plurality of second sub-blocks; and
performing, for each of the second sub-blocks, motion estimation comprising enablement of skip check for each of the second sub-blocks and evaluation of neighboring candidate motion vectors for each of the sub-blocks using sub-block to candidate sub-block distortion, transformed and quantized coefficient coding cost, and motion vector coding cost to select a second resultant candidate motion vector for each of the second sub-blocks.

12. The method of claim 10, wherein said evaluation of candidate motion vectors for each of the sub-blocks comprises selecting, for a first sub-block of the sub-blocks, a first selected resultant candidate motion vector having a lowest rate distortion optimization value of a plurality of candidate rate distortion optimization values, each candidate rate distortion optimization value being a sum of a candidate sub-block distortion and a candidate transformed and quantized coefficient coding cost multiplied by a Lagrange multiplier.

13. The method of claim 10, wherein said skip check for the block comprises:
determining, for each of the resultant candidate motion vectors, a reference block;
differencing each reference block with the block to determine a plurality of residual blocks;
transforming and quantizing each residual block to generate a plurality of coefficient blocks;
generating a coefficient measurement using each coefficient block; and
comparing a lowest coefficient measurement to a threshold.

14. At least one non-transitory machine readable medium comprising a plurality of instructions that, in response to being executed on a computing device, cause the computing device to code video by:
selecting first and second coding modes for first and second blocks of a video frame, respectively, at least partially in parallel, wherein the first block is immediately adjacent to a parallel processing split boundary of the video frame, wherein the parallel processing split boundary comprises a wavefront parallel processing split boundary that defines parallel coding mode processing for first blocks above and to the left of the wavefront parallel processing split boundary with second blocks below and to the right of the wavefront parallel processing split boundary, and wherein selecting the coding mode for the first block comprises:
dividing the first block into a plurality of sub-blocks;
performing, for each of the sub-blocks, motion estimation comprising disablement of skip check for each of the sub-blocks and evaluation of candidate motion vectors for each of the sub-blocks using sub-block to candidate sub-block distortion and transformed and quantized coefficient coding cost but exclusive of motion vector coding cost to select a resultant candidate motion vector for each of the sub-blocks;
evaluating skip check for the first block using each of the resultant candidate motion vectors for the sub-blocks; and determining the first coding mode based at least in part on the resultant candidate motion vectors for the sub-blocks and the skip check evaluation for the first block; and coding the first and second blocks using the selected first and second coding modes to generate a bitstream.

15. The non-transitory machine readable medium of claim 14, wherein selecting the second coding mode for the second block at least partially in parallel with selecting the first coding mode of the first block comprises:

dividing the second block into a plurality of second sub-blocks; and performing, for each of the second sub-blocks, motion estimation comprising enablement of skip check for each of the second sub-blocks and evaluation of neighboring candidate motion vectors for each of the sub-blocks using sub-block to candidate sub-block distortion, transformed and quantized coefficient coding cost, and motion vector coding cost to select a second resultant candidate motion vector for each of the second sub-blocks.

16. The non-transitory machine readable medium of claim 14, wherein said evaluation of candidate motion vectors for each of the sub-blocks comprises selecting, for a first sub-block of the sub-blocks, a first selected resultant candidate motion vector having a lowest rate distortion optimization value of a plurality of candidate rate distortion optimization values, each candidate rate distortion optimization value being a sum of a candidate sub-block distortion and a candidate transformed and quantized coefficient coding cost multiplied by a Lagrange multiplier.

17. The non-transitory machine readable medium of claim 14, wherein said skip check for the block comprises:

determining, for each of the resultant candidate motion vectors, a reference block;

differencing each reference block with the block to determine a plurality of residual blocks;

transforming and quantizing each residual block to generate a plurality of coefficient blocks;

generating a coefficient measurement using each coefficient block; and comparing a lowest coefficient measurement to a threshold.

* * * * *